US009135649B2

(12) United States Patent
Ruberia

(10) Patent No.: US 9,135,649 B2
(45) Date of Patent: Sep. 15, 2015

(54) MOBILE RETAIL UNIT FOR ON-SITE COATING APPLICATION, ASSOCIATED NETWORK AND METHOD OF USE

(71) Applicant: Valspar Sourcing, Inc., Minneapolis, MN (US)

(72) Inventor: Michael Martin Ruberia, Glen Ellyn, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 14/058,646

(22) Filed: Oct. 21, 2013

(65) Prior Publication Data

US 2014/0114809 A1    Apr. 24, 2014

Related U.S. Application Data

(60) Provisional application No. 61/715,914, filed on Oct. 19, 2012.

(51) Int. Cl.
*G06Q 30/06* (2012.01)

(52) U.S. Cl.
CPC ............ *G06Q 30/0623* (2013.01); *G06Q 30/06* (2013.01)

(58) Field of Classification Search
USPC ...................................................... 705/26, 27
IPC ........................... G06Q 30/00,10/00; H02J 3/00
See application file for complete search history.

(56) References Cited

U.S. PATENT DOCUMENTS

| | | | | |
|---|---|---|---|---|
| 6,155,747 A * | 12/2000 | Payne et al. | .............. | 405/129.55 |
| 7,919,546 B2 | 4/2011 | Trevino, III et al. | | |
| 8,141,599 B2 | 3/2012 | Korenkiewicz et al. | | |
| 2003/0004747 A1* | 1/2003 | Burton | .............................. | 705/1 |
| 2003/0106332 A1* | 6/2003 | Okamoto et al. | ............... | 62/239 |
| 2003/0225635 A1* | 12/2003 | Renz et al. | ....................... | 705/28 |
| 2004/0199297 A1* | 10/2004 | Schaper et al. | ............... | 700/287 |
| 2006/0276204 A1* | 12/2006 | Simpson et al. | ........... | 455/456.5 |
| 2007/0032965 A1 | 2/2007 | McClanahan et al. | | |
| 2009/0099694 A1* | 4/2009 | Trevino et al. | ................ | 700/265 |
| 2012/0046987 A1* | 2/2012 | Lee | .............................. | 705/7.21 |

OTHER PUBLICATIONS

ThePaintDrop.com: Internet Archive Wayback Machine, www.archive.org; Aug. 2011; 10pgs.*
International Search Report and Written Opinion dated Feb. 25, 2014 for corresponding International Application No. PCT/US2013/065885, filed Oct. 21, 2013, 11 pages.
Regnier Valdez "Truck Wrap", thePaintDrop.com, Nov. 24, 2010, 9 pages.

* cited by examiner

*Primary Examiner* — Rob Pond

(57) ABSTRACT

A mobile retail unit and associated network and method of use, where the mobile retail unit includes one or more of a customized-tint station and a climate-control system. The mobile retail unit also includes a computer-based system for storing inventory and order information, and which may include a network adapter configured to relay the inventory information and the order information over a wireless network between the computer-based system and a remote network center.

20 Claims, 23 Drawing Sheets

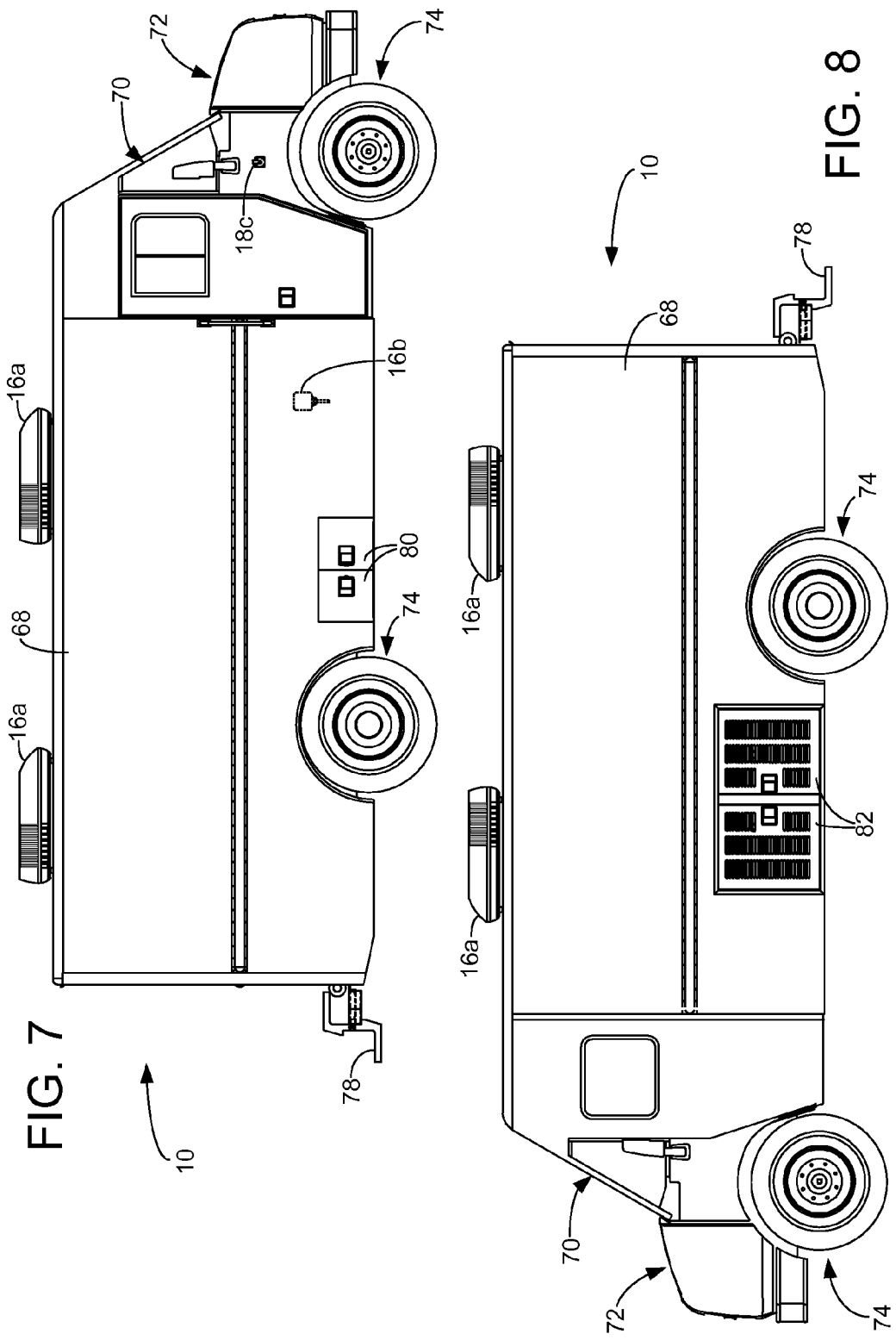

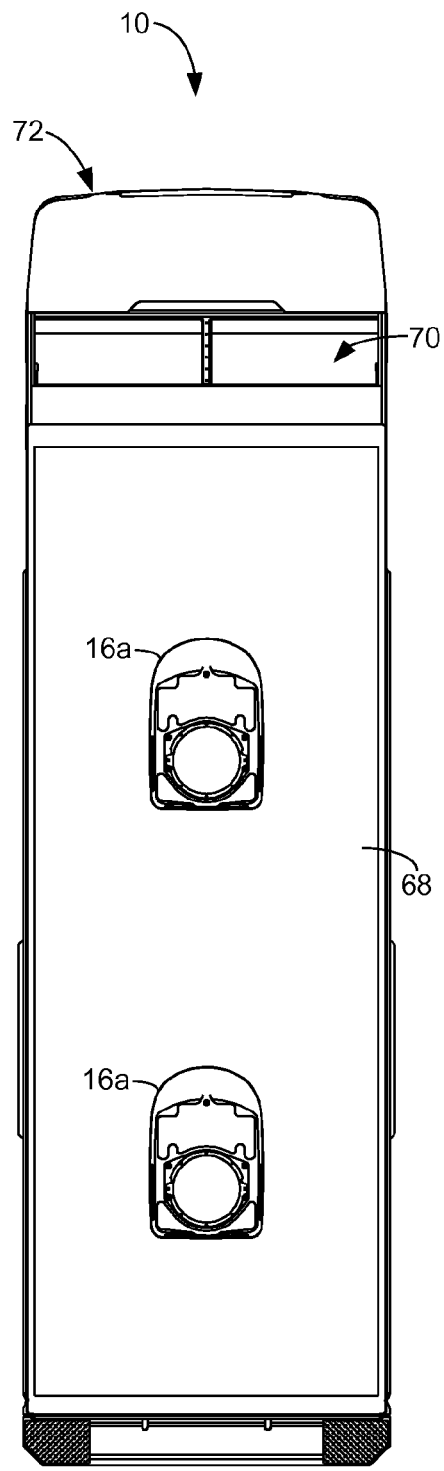
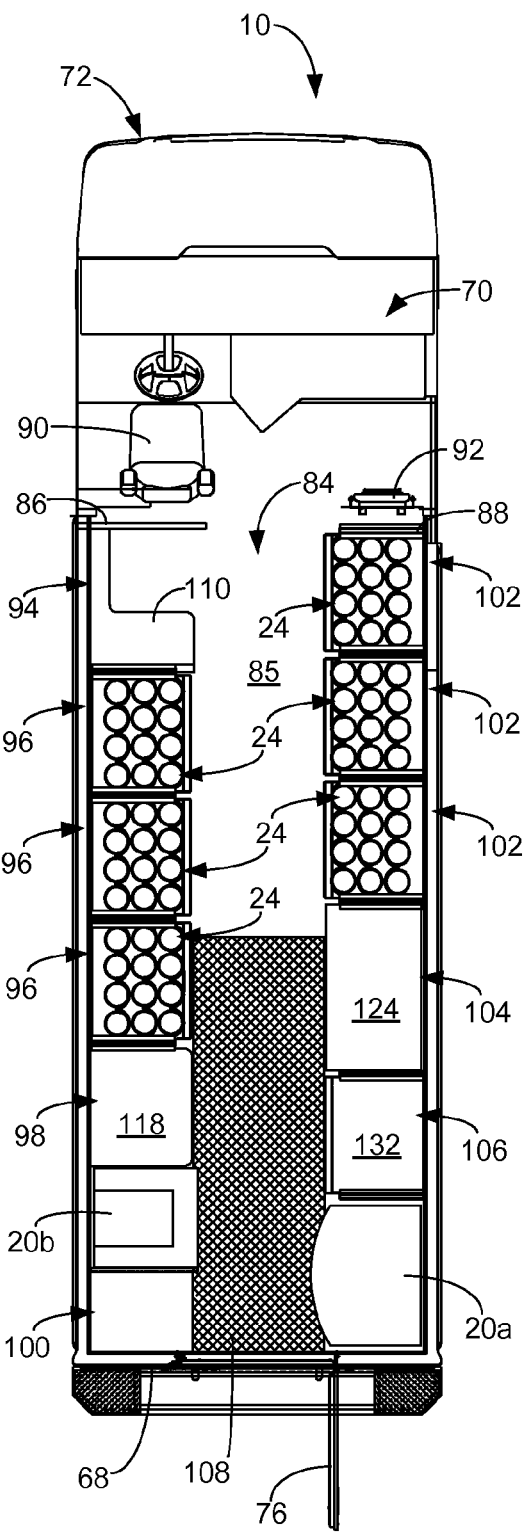
FIG. 9
FIG. 10

MOBILE RETAIL UNIT FOR ON-SITE COATING APPLICATION, ASSOCIATED NETWORK AND METHOD OF USE

CROSS-REFERENCE TO RELATED APPLICATION(S)

This application claims priority to U.S. Provisional Patent Application No. 61/715,914, filed on Oct. 19, 2012, which is entitled "MOBILE RETAIL UNIT FOR ON-SITE COATING APPLICATIONS, ASSOCIATED NETWORK AND METHOD OF USE".

FIELD

The present disclosure relates to applications for providing coating materials, such as paints, stains, and the like to consumers. In particular, the present disclosure relates to a mobile retail unit for providing coating materials to consumers, related network systems, and related processes.

BACKGROUND

Paint and stain manufacturers typically distribute premixed paints and stains in a small number of popular colors. To accommodate consumer desires and enable matching of existing painted or stained surfaces, paint and stain manufacturers typically also distribute a set of tintable base paints or stains and several concentrated colorants. These are combined in point-of-sale outlets using color dispensing and shaker equipment to make small batch lots of custom-tinted paint or stain in a much larger array of colors than the limited colors available in premixed products.

Owing in part to industry custom and the available colorant dispensing equipment, the custom color systems from different paint or stain manufacturers tend to have somewhat similar components. For example, base paints or stains may employ various binders (e.g., natural or synthetic resins), binder forms (e.g., solution polymers or latex polymers) and vehicles (e.g., solvent-base or waterborne versions), and may provide various dried surface finishes. Some manufacturers also sell colored base paints (e.g. a red, a blue and yellow colored base) which are intended to be combined with additional colorant(s) when one coat hiding power is desired for strongly-tinted custom paint shades.

SUMMARY

An aspect of the present disclosure is directed to a mobile retail unit that may include a mobile-vehicle frame having an interior configured to retain coating materials. The mobile retail unit may also include one or more of a climate-control system configured to maintain the interior of the mobile-vehicle frame within an environmental window, and a customized-tint station disposed within the interior. The mobile retail unit may further include a computer-based system for storing inventory information relating to the retained coating materials, and order information associating at least a portion of the retained coating materials to particular orders, and which may include a network adapter configured to relay the inventory information and the order information over a wireless network between the computer-based system and a remote network center.

Another aspect of the present disclosure is directed to a network for distributing coating materials, which may include a network center, one or more distribution outlets configured to store a supply of coating materials, and a mobile retail unit. The mobile retail unit may include storage units configured to retain coating materials that are loaded from the supply of coating materials in at least one of the distribution outlets, and a computer-based system. The computer-based system may be configured to communicate with the network center for relaying information comprising purchase request information, inventory information, or a combination thereof, and may be configured to update the inventory information based on the coating materials loaded to the mobile retail unit, and to relay the updated inventory information to the network center.

Another aspect of the present disclosure is directed to a method for distributing coating materials. The method includes receiving a purchase request and a location address for the purchase request, and loading coating materials from a distribution outlet to a mobile retail unit based on the purchase request. The method may also include driving the loaded mobile retail unit to the location address in the purchase request, and optionally maintaining a climate-controlled environment in the loaded mobile retail unit while driving to the location address, where the climate-controlled environment is configured to maintain an environmental window within the mobile retail unit. The method may further include optionally customizing a tint of the coating materials in the loaded mobile retail unit, and providing the coating materials with the optionally customized tint to a customer.

DEFINITIONS

Unless otherwise specified, the following terms as used herein have the meanings provided below:

The term "mobile-vehicle frame" refers to a frame that is connected to and/or transportable by a mobile vehicle. The frame itself may or may not be integrally connected to the mobile vehicle. For example, a frame of a van or box truck are typically integral components of the mobile vehicles. However, a frame of a trailer or semi trailer is typically a separate component from the mobile vehicle (e.g., a separate panel van, pickup truck, semi cab, or other tractor unit), and may be coupled to and decoupled from the mobile vehicle.

The terms "about" and "substantially" are used herein with respect to measurable values and ranges due to expected variations known to those skilled in the art (e.g., limitations and variabilities in measurements).

The terms "preferred" and "preferably" refer to embodiments of the invention that may afford certain benefits, under certain circumstances. However, other embodiments may also be preferred under the same, or other circumstances. Furthermore, the recitation of one or more preferred embodiments does not imply that other embodiments are not useful, and is not intended to exclude other embodiments from the scope of the invention.

BRIEF DESCRIPTION OF THE DRAWINGS

FIG. 7 is a right side view of the example embodiment of the box-truck mobile retail unit.

FIG. 8 is a left side view of the example embodiment of the box-truck mobile retail unit.

FIG. 9 is a top view of the example embodiment of the box-truck mobile retail unit.

FIG. 10 is a sectional view of section 10-10 taken in FIG. 5, showing a bottom portion of an interior of the box-truck mobile retail unit.

DETAILED DESCRIPTION

Figure 1:
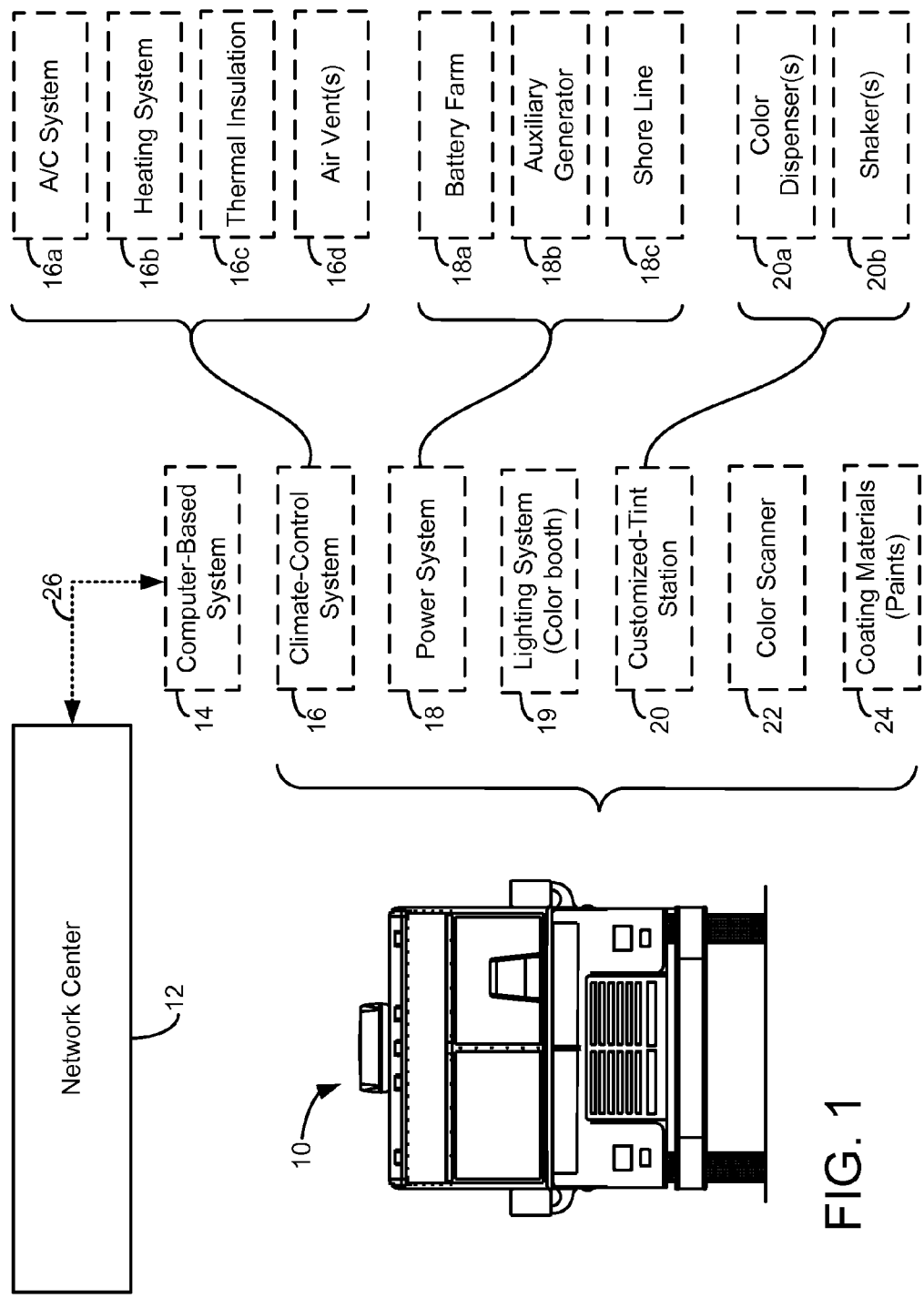
FIG. 1 is a schematic illustration of a mobile retail unit of the present disclosure in use with a network center.

The present disclosure is directed to a mobile retail unit for transporting and providing customized, point-of-sale coating materials (e.g., paints and stains) and sundries to on-site locations, preferably in a climate-controlled manner. The present disclosure is also directed to a network system configured to operate with one or more of the mobile retail units for relaying information between one or more network centers and the mobile retail unit(s), such as purchase request information, inventory information, and the like.

The mobile retail unit may be operated by a retail associate who receives purchase requests from the network center or directly from customers. Typical customers may include painting contractors, residential homeowners, or other suitable persons. For example, a homeowner or painting contractor, who desires to paint a home, may send a purchase request over the network identifying a desired paint color and finish, quantity of paint, any sundries, the homeowner's address, and a desired delivery time and date. In some situations, the customer may not necessarily know the exact color or finish he or she desires. In these cases, the purchase request may be for an unspecified or preliminary paint color or finish. The purchase request may then be relayed over the network to the retail associate. Alternatively, the customer may directly contact the retail associate with the purchase request, and the retail associate may enter it into a network.

The retail associate may then load a supply of the appropriate paint, related materials (e.g., primers), and sundries into the mobile retail unit. Inventory information relating to the supplied paint, related materials, and sundries may also be relayed over the network and associated with the given mobile retail unit, the retail associate, and the purchase request.

The retail associate may then drive the mobile retail unit to the address location identified in the purchase request. Upon arrival, the retail associate may provide the customer with one or more initial test samples of the ordered paint, which the customer may then use to paint test swatches. This allows the customer to see the painted swatches with the proper lighting of the on-site location. If the customer wishes to adjust the tint of the paint, the retail associate may readily do so in the mobile retail unit. This process can be repeated iteratively until the desired paint tint is achieved.

As can be appreciated, without the mobile retail unit, the customer may otherwise be required to take several trips to a local store to adjust the tint of the paint. This can be an inconvenient and time consuming process, and can result in the lighting conditions changing throughout a given day. The mobile retail unit, however, allows the paint tint to be customized in a substantially on-demand manner at the on-site location. This provides a convenient mechanism for finalizing the tint of the paint, and allows multiple, successive swatches to be painted in a short amount of time, thereby utilizing the same or similar lighting conditions.

Once the paint tint is finalized, the retail associate may mix and produce the desired quality of the paint with the desired color in the mobile retail unit, which is then ready for purchase and use by the customer. The purchase details of the finalized paint may also be relayed over the network for inventory, accounting, and quality control purposes.

As discussed below, the mobile retail unit preferably operates in a climate-controlled manner to preserve the coating materials (e.g., paints and stains) during storage, transportation, and mixing in the mobile retail unit. This allows the mobile retail unit to operate in a variety of environmental conditions for extended durations that could otherwise adversely affect the coating materials, such as hot and humid conditions, or cold, wintry conditions.

FIG. 1 shows mobile retail unit ("MRU") 10 in use with network center 12, where MRU 10 is an example mobile retail unit of the present disclosure for delivering customized, point-of-sale coating materials and sundries to multiple on-site locations. The following discussion of the "coating materials" is made with reference to paint. However, MRU 10 may deliver a variety of different coating materials, such as interior and exterior paints and stains, primers, waterproof coatings, sealant coatings, and the like.

Network center 12 is a computer-based network configured to receive and process information, such as purchase requests and inventory information, for one or more mobile retail units, such as MRU 10. In some embodiments, network center 12 may be fully automated with computer-based systems. Alternatively, network center 12 may be operated by a combination of personnel and computer-based systems. In this alternative embodiment, the personnel may operate as customer service and sales representatives for receiving purchases orders from customers, and as service representatives for the retail associates.

In the shown embodiment, MRU 10 includes computer 14, climate-control system 16, power system 18, lighting system 19, customized-tint station 20, and color scanner 22, and may also retain containers of paint 24 (or other coating materials) and sundries (not shown). Paint 24 may include base paints that can be mixed with tints in customized-tint station 20, as well as end-use paints having preselected colors and dried surface finishes (e.g., matte, semi-gloss, or gloss finishes).

Computer 14 is a fixed or portable computer-based system that may be retained by and transported with MRU 10, and is configured to communicate with network center 12 over one or more wireless communication lines 26 (e.g., cellular wide area networks and Wi-Fi local area networks). This allows computer 14 to send and receive purchase request information, inventory information, and the like, as discussed below.

Climate-control system 16 may include one or more units configured to actively and/or passively maintain the interior of the MRU 10 within an environmental window that preserves the shelf lives and usability of paint 24. As mentioned above, this allows MRU 10 to operate in a variety of environmental temperatures, such as hot conditions (e.g., summertime in Arizona) and cold conditions (e.g., wintertime in Minnesota). Extreme temperatures, particularly below-freezing temperatures, can negatively affect paint 24 and render it unusable. Climate-control system 16, however, eliminates these potential issues by maintaining the interior of MRU 10 within a suitable environmental window for paint 24.

The suitable environmental window for paint 24 may vary depending on the composition of paint 24 (e.g., water-based versus oil-based paints). Examples of preferred environmental windows for maintaining the interior of MRU 10, at least in the vicinity of paint 24, range from temperatures greater than about 0° C. (about 32° F.) to about 38° C. (about 100° F.), more preferably from about 4° C. (about 40° F.) to about 32° C. (about 90° F.), and even more preferably from about 10° C. (about 50° F.) to about 27° C. (about 80° F.).

In the shown embodiment, climate-control system 16 may include one or more active climate-control units, such as air-conditioning system 16a and heating system 16b, and/or one or more passive climate-control units, such as thermal insulation 16c and one or more air vents 16d. Air-conditioning system 16a is configured to cool the interior of MRU 10 and control the humidity, if desired. Heating system 16b is configured to heat the interior of MRU 10.

Thermal insulation 16c is one or more thermally-insulating liners of the walls, ceiling, and/or floor of MRU 10 such as foam insulation liners, fiberglass insulation liners, and the like. Thermal insulation 16c preferably provides enough thermal insulation such that the interior of MRU 10, at least in the vicinity of paint 24, remains within the suitable environmental window for paint 24 even when MRU 10 is exposed to extreme conditions overnight. For instance, thermal insulation 16c preferably maintains this suitable environmental window even if MRU 10 is parked outside on a cold night (e.g., for 8 eight hours at 0° C.) with heating system 16c shut off.

Additionally, thermal insulation 16c preferably prevents rapid temperature changes within the interior of MRU 10, which can otherwise potentially have adverse effects on paint 24 (e.g., condensation formation). Accordingly, any temperature changes within the interior of MRU 10, at least in the vicinity of paint 24, preferably increase or decrease at a rate of less than 10° C. per hour, and more preferably less than about 5° C. per hour.

Power system 18 may include one or more electrical sources configured to provide electrical power to computer 14, climate-control system 16, lighting system 19, customized-tint system 20, color scanner 22, and optionally, other systems of MRU 10 (e.g., other lighting systems). Power system 18 may include one or more of a battery farm 18a having one or more rechargeable batteries, an auxiliary generator 18b configured to generate electrical power from the fuel of MRU 10, and a shore line 18c for receiving electrical power from an external source when MRU 10 is parked. Preferably, power system 18 includes each of these components, allowing MRU 10 to continuously provide electrical power to climate-control system 16 when needed.

For example, if MRU 10 is parked outside in cold conditions for an extended duration (e.g., overnight) while retaining paint 24, MRU 10 may be connected to an external electrical source via shore line 18c to provide electrical power, such as about 100 volts alternating current, to battery farm 18a. If an external electrical source is not available, climate-control system 16 may still be powered by auxiliary generator 18b, which may consume fuel from MRU 10 to generate and provide electrical power to battery farm 18a. In either situation, climate-control system 16 may then continuously receive electrical power from battery farm 18a.

In further embodiments, power system 18 preferably includes a power management tool to balance electrical power distributions between the devices of MRU 10. For instance, when a user operates a unit of customized-tint system 20, power system 18 may temporarily shut off air-conditioning system 16a to limit the total electrical power consumption at any given point in time. This accordingly allows auxiliary generator 18b to be smaller and less expensive.

Lighting system 19 is an interior lighting system for MRU 10 to provide suitable lighting conditions to work in. Additionally, in some embodiments, lighting system 19 may be configured to emit color-balanced lighting that simulates one or more lighting conditions, such as fluorescent lighting, incandescent lighting, north daylight, and the like. The color-balanced lighting can be advantageous for producing paint tints in the desired lighting conditions. Lighting system 19 may further be combined with one or more areas of MRU 10 having a neutral gray background, such as neutral gray walls, desks, and the like (e.g., a color booth), which can provide true renditions of color.

Customized-tint station 20 may include one or more colorant dispensers 20a and mixers 20b (e.g., shakers), and is configured to mix base paints with colorants to obtain paints with the desired tints. Suitable colorant dispensers and shakers include those disclosed in Korenkiewicz et al., U.S. Pat. No. 8,141,599; those commercially available from HERO Products Group, British Columbia, Canada, and those that are preferably small and efficient power users. The use of customized-tint station 20 on a mobile platform, such as MRU 10, may provide several advantages. First, it allows the retail associate to premix paint samples based on the purchase requests to have them ready upon arrival at the on-site locations. For example, the retail associate may add a colorant to a base paint with colorant dispenser 20a, place the color-added base paint in mixer 20b, and allow the colorant and base paint to mix in mixer 20b during transit to the on-site location. The customers may then begin painting swatches of the paint samples upon arrival.

Additionally, customized-tint station 20, along with color scanner 22, allows customized paint tints to be adjusted and finalized in a substantially on-demand manner at the on-site location. Color scanner 22 is a portable, color-matching spectrophotometer, which may provide color-related information to customized-tint station 20. As mentioned above, this provides a convenient mechanism for finalizing the tint of the paint, and allows multiple, successive swatches to be painted in a short amount of time.

Figure 2:
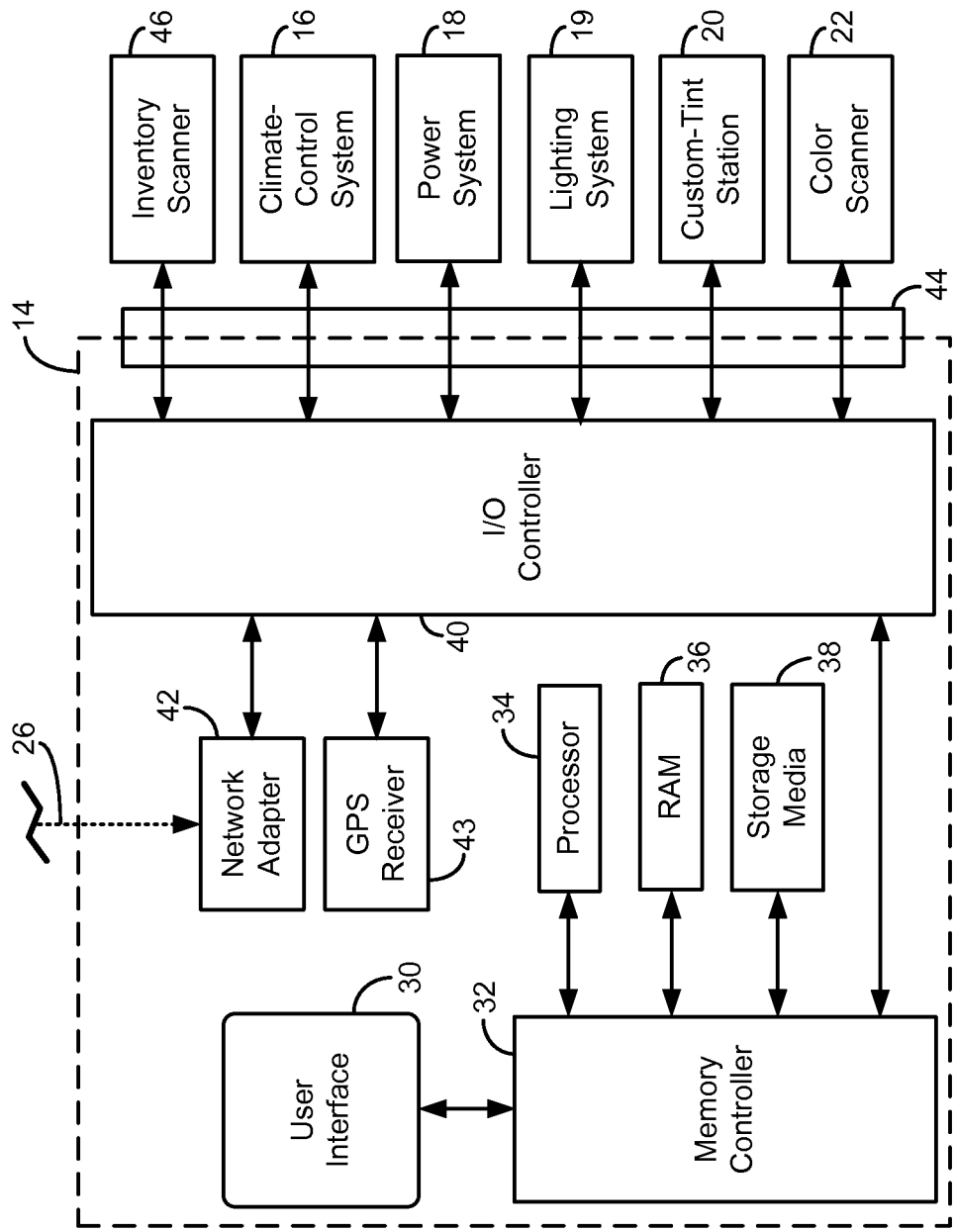
FIG. 2 is a schematic illustration of a computer-based system of the mobile retail unit.

FIG. 2 illustrates an example architecture for computer 14. As shown, computer 14 may include user interface 30, memory controller 32, processor 34, RAM 36, storage media 38, input/output (I/O) controller 40, network adapter 42, and GPS receiver 43. Computer 14 may also include a variety of additional components that are contained in conventional computers and/or media-player devices. Alternatively, computer 14 may be a local terminal configured to communicate with one or more cloud servers, where the cloud servers may perform the data processing.

User interface 30 is operating system or other user-operated interface (e.g., keyboards, touch-screen displays, and other hand-operated controls) configured to operate computer 14. Memory controller 32 is a circuit assembly that interfaces the components of computer 14 with RAM 36. Processor 34 is one or more computer-processing units, and RAM 36 is one or more volatile random access memory modules. Computer 14 may also include one or more read-only memory modules (not shown) for storage of firmware and the like.

Storage media 38 is one or more internal and/or external data storage devices for computer 14, such as optical media, magnetic media (e.g., hard disc drives), solid-state media (e.g., FLASH memory and solid-state drives), analog media, and the like, for non-transitory data storage. I/O controller 40 is a circuit assembly that interfaces memory controller 32, processor 34, and RAM 36 with various input and output components of computer 14, including network adapter 42.

Network adapter 42 is one or more wireless transmitter and receiver adapters configured to communicate with network center 12 over wireless communication line 26. For example, network adapter 42 may be cellular wide area network transmitter/receiver, a Wi-Fi local area network transmitter/receiver, or a combination thereof.

GPS receiver 43 is a global positioning system (GPS) receiver, and may also include additional navigation and motion-based features, such as a digital compass and accelerometers. GPS receiver 43 may be configured to calculate location information based on satellite data, cellular tower data, Wi-Fi data, or combinations of the aforementioned. Network adapter 42 and GPS receiver 43 may be internal components of computer 14, or external components configured to couple with I/O controller 40.

As further shown in FIG. 2, I/O controller 40 may communicate with one or more external devices over computer interface 44. Computer interface 44 is one or more electrical and/or optical interfaces for connecting to external devices, such as one or more of an inventory scanner 46, climate-control system 16, power system 18, lighting system 19, custom-tint station 20, a payment device, a security device, and color scanner 22. Inventory scanner 46 is a portable optical or wireless scanner configured to read information from containers of paint 24 (e.g., SKU numbers on paint containers). This allows computer 14 and network center 12 to track each container of paint 24 for inventory purposes.

Connecting inventory scanner 46, climate-control system 16, power system 18, lighting system 19, custom-tint station 20, and color scanner 22 to computer 14 allows the retail associate to control these systems over computer 14, if desired. In alternative embodiments, one or more of these systems may communicate wirelessly with computer 14 over network adapter 42 rather than through a physical connection at computer interface 44.

In further alternative embodiments, one or more of inventory scanner 46, climate-control system 16, power system 18, custom-tint station 20, and color scanner 22 may be separate from computer 14, where the given device does not directly communicate with computer 14. For example, climate-control system 16, power system 18, and/or lighting system 19 may be operated by separate control mechanisms of MRU 10, such as a power panel in the cabin of MRU 10.

In another example, one or more of custom-tint station 20, color scanner 22, and inventory scanner 46 may be separate from computer 14. In this embodiment, the tint and inventory information may be retained by custom-tint station 20, color scanner 22, and inventory scanner 46, independently of computer 14. However, if desired, the retail associate may manually enter the given information into computer 14 for transmission to network center 12.

In some embodiments, computer 14 may be a portable media device, such as a laptop computer, smart phone, portable media player, personal digital assistant (PDA), tablet device, and the like. In this embodiment, one or more of color scanner 22 and inventory scanner 46 may be integrated into computer 14, such as with an optical camera and software stored on RAM 36 and/or storage media 38 that is operable by processor 34 to simulate the functions of color scanner 22 and inventory scanner 46. This is beneficial since computer 14 may then store the scanned information into RAM 36 and/or storage media 38, and may also relay the scanned information to network center 12.

As briefly mentioned above, network center 12 may be a computer-based network configured to receive and process information, such as purchase requests and inventory information. Accordingly, network center 12 may include one or more computer-based systems having appropriate hardware to function as a database and sales center, such as user interfaces, memory controllers, processors, memory modules, storage media, interfaces, network adapters, and the like, as shown for computer 14.

Figure 3A:
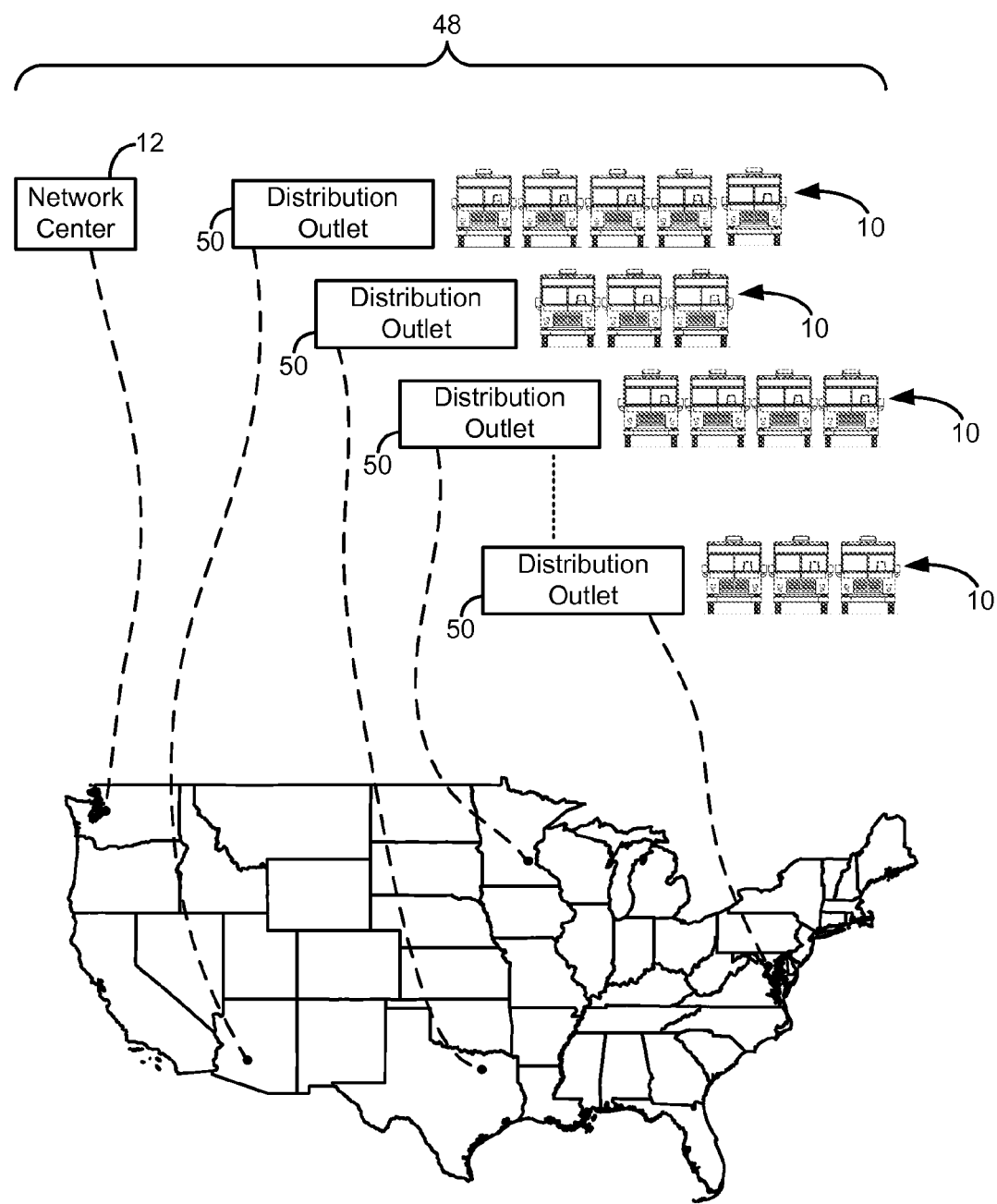
FIG. 3A is a schematic illustration of a network system that includes a network center, multiple mobile retail units, and multiple distribution outlets.

FIG. 3A illustrates an example network arrangement for operating network center 12 with multiple MRUs 10, referred to as network 48. As shown, a single network center 12 may operate with multiple MRUs 10 located in a variety of separate areas, such as in different metropolitan areas around the United States (as shown), or around the world. For each area in which one or more MRUs 10 operate, network 48 preferably includes one or more warehouses or other distribution outlets 50, where the retail associates may pick up the supplies of paint 24 to fulfill their deliveries.

Network center 12, which may be hosted in a dedicated server, a cloud server, or both, may correspondingly communicate with each MRU 10 and each distribution outlet 50 to monitor inventories and deliveries over communication line 26 (shown in FIGS. 1 and 2). In alternative embodiments, network 48 may include multiple network centers 12, such as a separate network center 12 for each distribution outlet 50 (e.g., as shown below in FIG. 3B), or even for each MRU 10. However, the use of a single network center 12 provides the distributor of paint 24 greater control over distribution, delivery, and quality control logistics.

For example, network center 12 may receive purchase requests from customers around the United States (or the world) over the Internet, by telephone, or other suitable means. The purchase requests may be received in a variety of different manners, such as standard orders, pre-orders, onthe-spot custom orders, and the like. For a given metropolitan area, multiple MRUs 10 may each have separate sales territories in which they operate. Network center 12 may schedule deliveries under the purchase requests to the MRUs 10 based on these sales territories. Additionally, in some situations in which multiple orders are scheduled for delivery at the same time within a single sales territory, network center 12 may assign the orders to multiple MRU 10 retail associates to operate in the same territory.

Figure 3B:
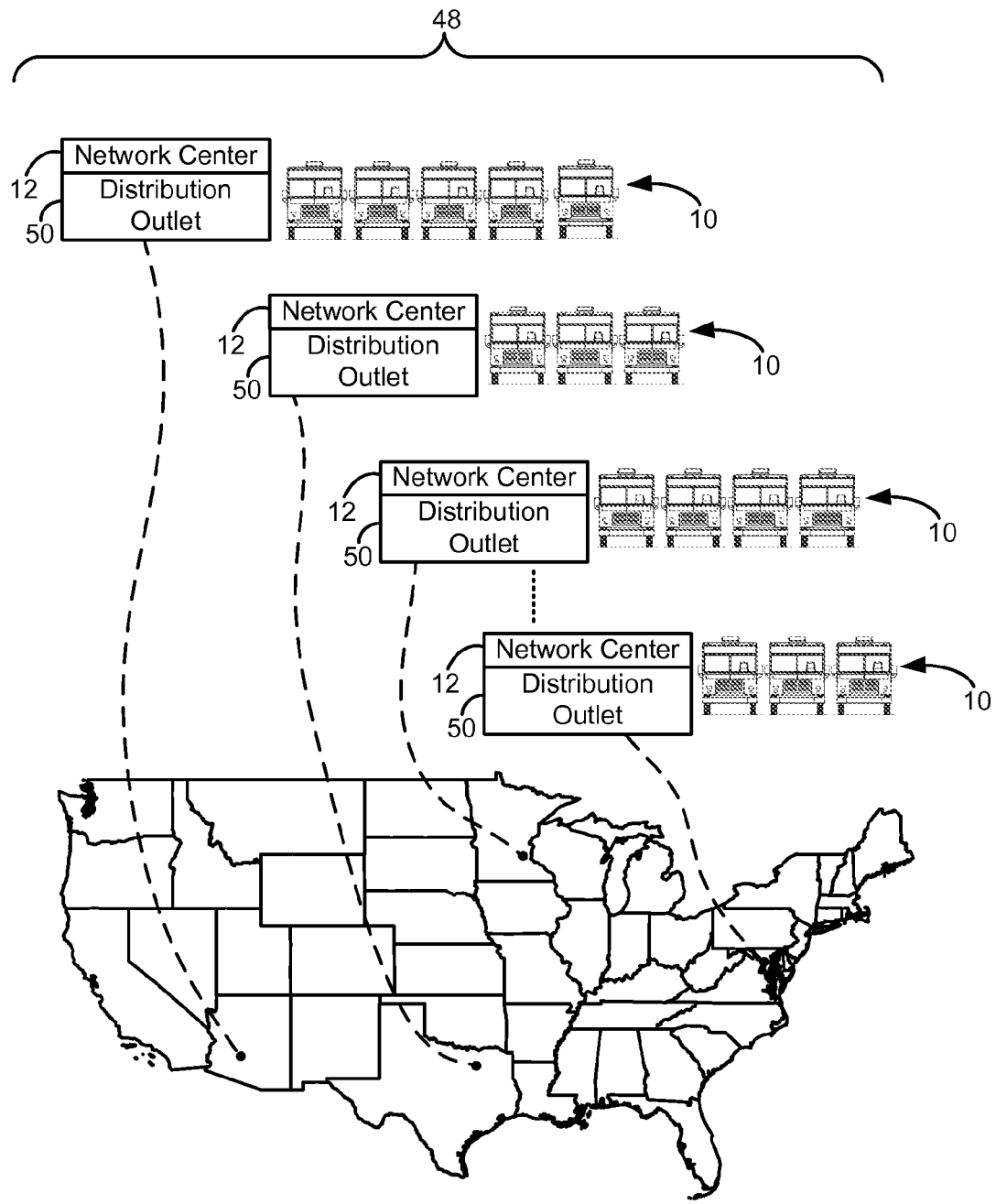
FIG. 3B is a schematic illustration of a first alternative network system that includes multiple mobile retail units and multiple distribution outlets with associated network centers.

As shown in FIG. 3B, in some embodiments, each distribution outlet 50 may include its own network center 12, where the network centers 12/distribution outlets 50 may operate independently from each other, and each may receive supplies of the paint 24 (and other coating materials and sundries) from one or more manufacturers. As such, each network center 12/distribution outlet 50 may operate as a sales channel for the manufacturer, as a subsidiary of the manufacturer, as an independent customer of the manufacturer, or as a franchisee of the manufacturer.

Furthermore, one or more of the network centers 12/distribution outlets 50 may also operate as a paint store, home improvement store, or other similar retail outlet for selling coating materials (e.g., paints and stains), sundries, and other products to walk-in customers. In this case, a first portion of a given distribution outlet 50 may operate as a retail outlet (e.g., a paint store or a home improvement store), and a second portion may operate as a warehouse for one or more MRUs 10. The associated network center 12 may then coordinate the sales and distributions of the coating materials and sundries for the retail outlet and the MRUs 10.

Figure 3C:
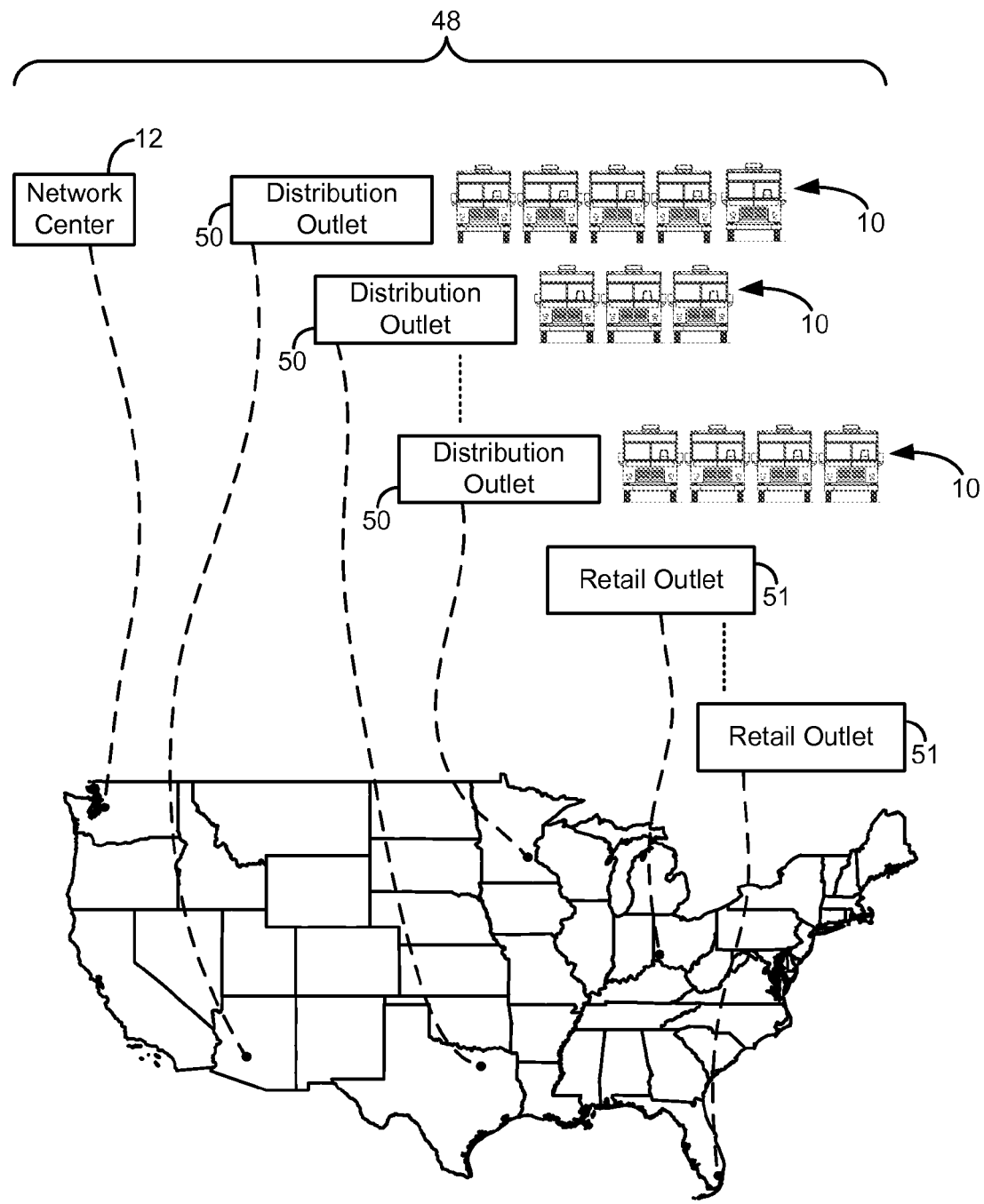
FIG. 3C is a schematic illustration of a second alternative network system that includes a network center, multiple mobile retail units, multiple distribution outlets, and one or more retail outlets.
Figure 3D:
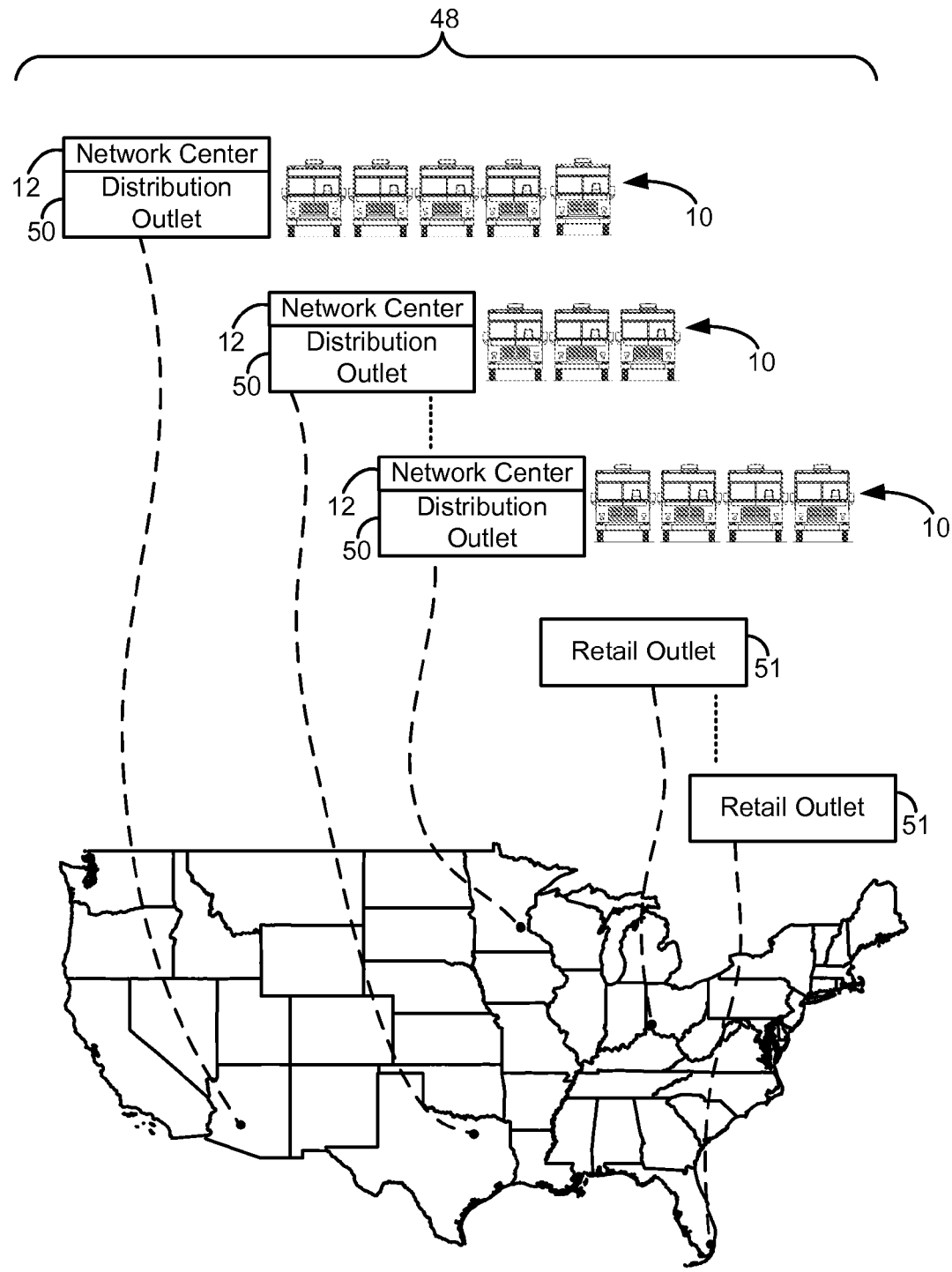
FIG. 3D is a schematic illustration of a third alternative network system that includes multiple mobile retail units and multiple distribution outlets with associated network centers, as well as one or more retail outlets.

In further alternative embodiments, as illustrated in FIGS. 3C and 3D, network 48 may also include one or more standard retail outlets 51 in addition to network center(s) 12 and distribution outlets 50. The embodiment shown in FIG. 3C corresponds to the single network center embodiment shown in FIG. 3A, and the embodiment shown in FIG. 3D corresponds to the independent network centers 12/distribution outlets 50 shown in FIG. 3B. In these embodiments, the retail outlets 51 may incorporate their own network centers 12 as well, if desired.

The embodiments shown in FIGS. 3C and 3D may be achieved by (i) jointly setting up distribution outlets 50 and retail units 51, (ii) adding distribution outlets 50 to an existing network of retail outlets 51 (e.g., instead or in addition to setting up additional retail outlets 51), and/or (iii) converting existing retail outlets 51 (or portions thereof) into distribution outlets 50. This latter situation (iii) can be advantageous since the supply chains for the retail outlets 51 already exist. In other words, the distribution outlets 50 converted from existing retail outlets 51 may be restocked with coating materials and sundries using the existing supply chains from the retail outlets 51.

The above-discussed embodiments shown in FIGS. 3A-3D are illustrated with the same types of MRUs 10. However, each distribution outlet 50 may alternatively operate with a fleet of different MRUs 10, such as MRUs 10 based on box trucks, vans, pickup trucks, vans or pickup trucks with attached pull-behind trailers, semi-trailer trucks, and the like, as well as one or more standard delivery vehicles (e.g., standard vans and trucks). As such, each network center 12 may designate a particular type of MRU 10 from the fleet for a given on-site location depending on the type of purchase request that needs to be fulfilled.

For instance, if a purchase request is relatively small, but still requires an on-demand paint customization, a box truck-type or van-type MRU 10 may be sufficient. Alternatively, if a purchase request is large and requires the MRU 10 to be deployed at the on-site location for an extended period of time (e.g., multiple days or weeks), then a pull-behind trailer or a semi-trailer truck-type MRU 10 may be utilized. On the other hand, in some situations, the customer may only require delivery of paint without any on-demand paint customization. In this delivery case, a standard delivery vehicle other than an MRU 10 (e.g., a standard van or truck) may be used to deliver the paint.

Figure 4A:
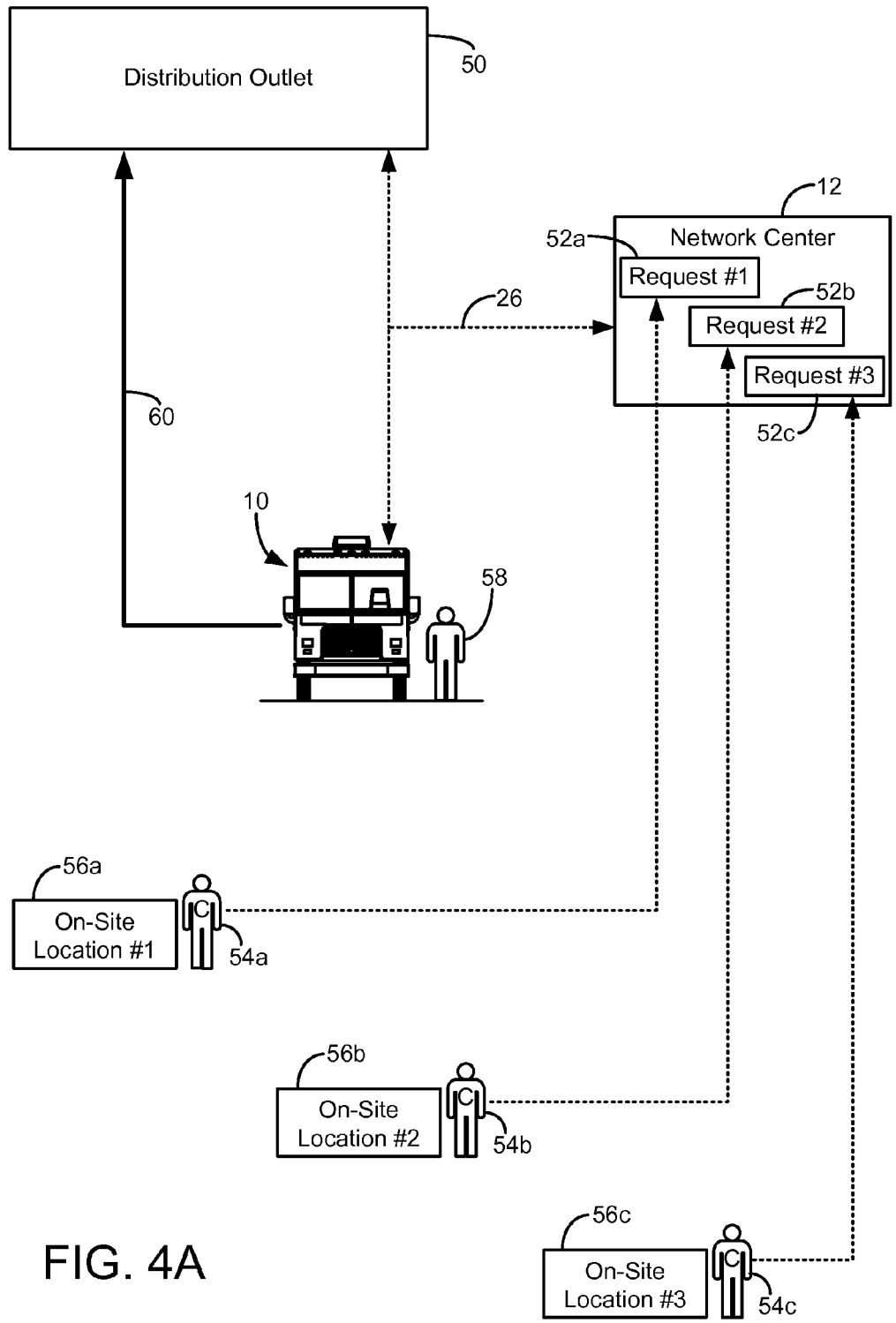
FIGS. 4A-4E are schematic illustrations of a process for providing customized, point-of-sale coating materials to on-site locations, using a network center, a mobile retail unit, and a distribution outlet.

FIGS. 4A-4E illustrate an example process for providing customized, point-of-sale paints or other coating materials to on-site locations in a climate-controlled manner with network center 12, a single MRU 10, and distribution outlet 50, where the network arrangement may exist under any one of the embodiments shown above in FIGS. 3A-3D. As shown in FIG. 4A, in this example, network center 12 receives purchase requests 52a-52c from customers 54a-54c, where the deliveries are to be made on the same day at on-site locations 56a-56c.

Network center 12 may then relay the purchase requests 52a-52c, and any related information, over communication line 26 to computer 14 of MRU 10. The related information may include, for example, the amount of paint 24 required to fulfill purchase requests 52a-52c, the current inventory in MRU 10, and the difference between these values, which corresponds to the amount of paint 24 that the retail associate operating MRU 10 (referred to as retail associate 58) needs to pick up from distribution outlet 50.

Accordingly, retail associate 58 may drive MRU 10 to distribution outlet 50 to pick up the required amount of paint 24 and sundries, as illustrated by arrow 60 in FIG. 4A. In some embodiments, distribution outlet 50 may optionally include a garage for MRU 10. In these embodiments, MRU 10 may already be present at distribution outlet 50 upon receipt of the purchase requests 52a-52c. At distribution outlet 50, retail associate 58 may scan in the paint containers with inventory scanner 46, computer 14, or other suitable device. This updated inventory information may then be relayed to network center 12 over communication line 26 to update the inventories in MRU 10 and in distribution outlet 50 (e.g., for restocking purposes). This arrangement may allow retail associate 58 to load MRU 10 from distribution outlet 50 in an automated manner without the assistance of extra personnel.

In some embodiments, the updated inventory information may correspond to a restocking trigger condition, such as a minimum threshold number of paint containers or sundries, for restocking distribution outlet 50. For example, when network center 12 (or other suitable system) receives updated inventory information for a particular distribution outlet 50 and identifies that the paint supply in the distribution outlet 50 is low, network center 12 may relay instructions for restocking the distribution outlet 50 with the necessary paint.

Figure 4B:
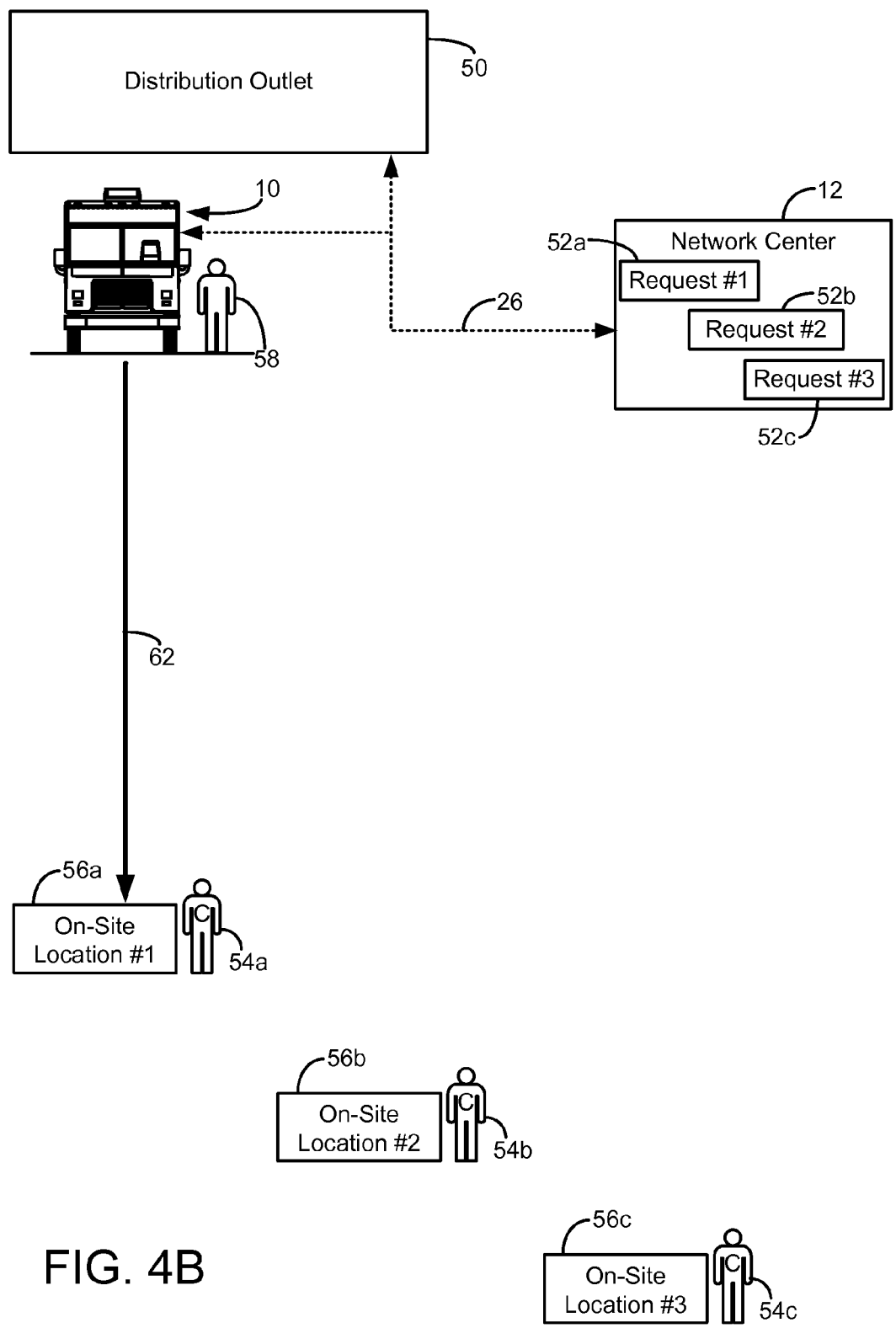

As shown in FIG. 4B, once supplied with the required paint 24, retail associate 58 may use computer 14 to identify the address of on-site location 56a, and drive MRU 10 to on-site location 56a, as illustrated by arrow 62. In some embodiments, computer 14 may also include a mapping application stored on RAM 36 and/or storage media 38, and operable with processor 34 to generate directions and an associated map on user interface 30 based on the addresses provided in the purchase requests.

Computer 14 may also use GPS receiver 43 to assist the mapping application in generating directions based on GPS locations. In preferred embodiments, the mapping application will optimize the delivery route to minimize one or more of travel time/distance, waiting time, and the like. Moreover, computer 14 may transmit the GPS locations of MRU 10 to network center 12 and/or to customers (e.g., customers 54a-

54c), along with related information, such as estimated times of arrival. For instance, customers may operate applications on their own computer devices (e.g., smart phones, tablets, and the like) to communicate with network center 12 and/or MRU 10 to receive information related to their purchase requests. In some embodiments, computer 14 may also receive customer information, such as GPS coordinates of a customer, that are transmitted to network center 12 and/or MRU 10 via the customer's computer device.

Climate-control system 16 in MRU 10 allows MRU 10 to be operated in a variety of environmental conditions, as discussed above. If MRU 10 is operated in hot conditions while in transit to on-site location 56a, climate-control system 16 may keep the interior of MRU 10 cool, to preserve the shelf life of paint 24 and/or provide a welcoming environment for a customer to visit. Alternatively, if MRU 10 is operated in cold conditions, climate-control system 16 may keep the interior of MRU 10 warm, such as to prevent paint 24 from freezing during transit.

In some situations, such as those in which retail associate 58 receives the delivery information from network center 12 one or more days in advance of the delivery dates, retail associate 58 may pick up the required paint 24 from distribution outlet 50 in advance of the delivery date (e.g., one or more days in advance). This is beneficial for early morning deliveries, which many customers may prefer to give them ample time to paint during the day.

However, in some situations, retail associate 58 may not have access to a storage garage for parking MRU 10 overnight in climate-controlled conditions, since such garages can be expensive to own or rent. Thus, MRU 10 may be parked outside overnight and exposed to ambient conditions. If this occurs in cold climates, climate-control system 16 may be operated continuously overnight to maintain the interior of MRU 10 within an environmental window that preserves the shelf lives and usability of paint 24, and prevents paint 24 from freezing overnight. As discussed above, climate-control system 16 may be powered via battery farm 18a, which may be supplemented by auxiliary generator 18b and shore line 18c. Thus, climate-control system 16 is configured to protect paint 24 (or other coating materials) from temperature extremes, allowing retail associate 58 to consistently deliver high-quality paints and other coating materials, regardless of the environmental conditions in which MRU 10 operates.

Figure 4C:
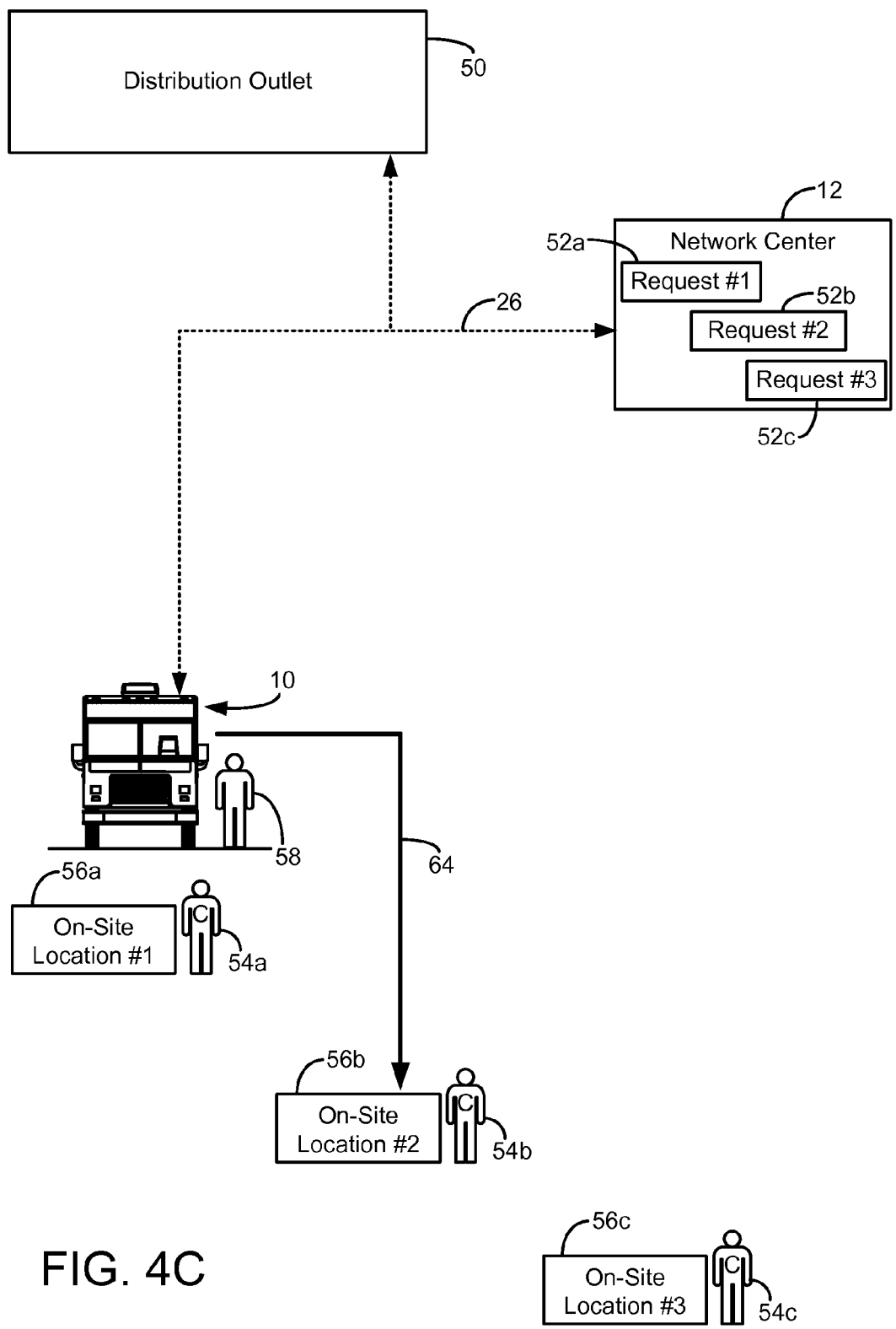

As shown in FIG. 4C, upon arrival at on-site location 56a, retail associate 58 may provide customer 54a with samples of paint 24, as discussed above, allowing customer 54a to paint test swatches. Customer 54a and retail associate 58 may then work together to finalize the tint of paint 24 with custom-tint station 20 and/or color scanner 22, if desired. Once the tint is finalized, retail associate 58 may prepare the ordered volume of paint 24 with custom-tint station 20, and sell the prepared paint 24 and any sundries to customer 54a.

During the preparation and sale of paint 24, retail associate 58 may use one or more of computer 14, custom-tint station 20, color scanner 22, and inventory scanner 46 to update the information for purchase request 52a, such as the number of paint containers used and sold, the tint of the finalized paint, the number and types of sundries sold, the transaction amount, the time of transaction, the delivery duration, customer feedback, and the like. Computer 14 may then relay this updated information to network center 12 over communication line 26. Network center 12 may then update its database with the received information.

Figure 4D:
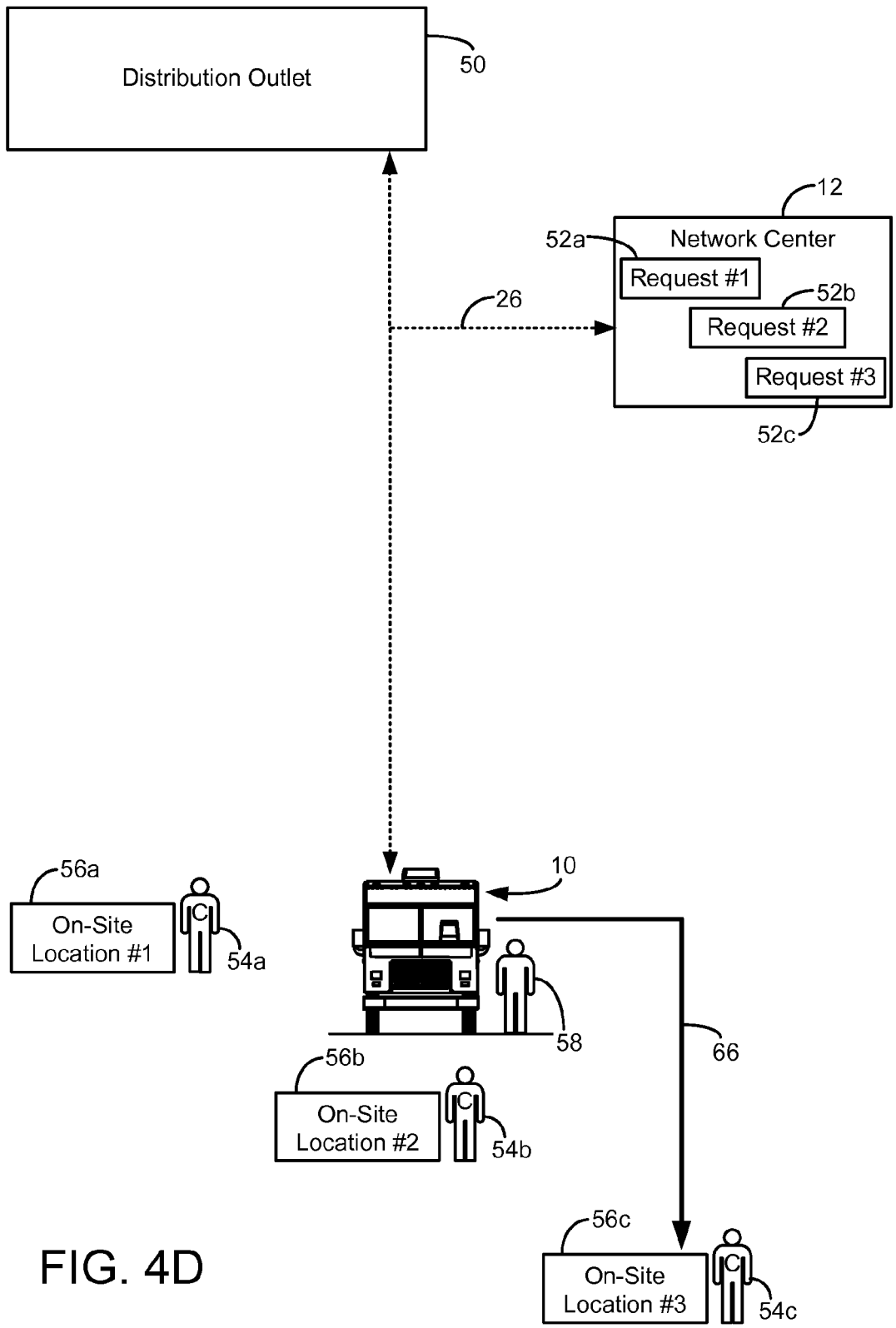
Figure 4E:
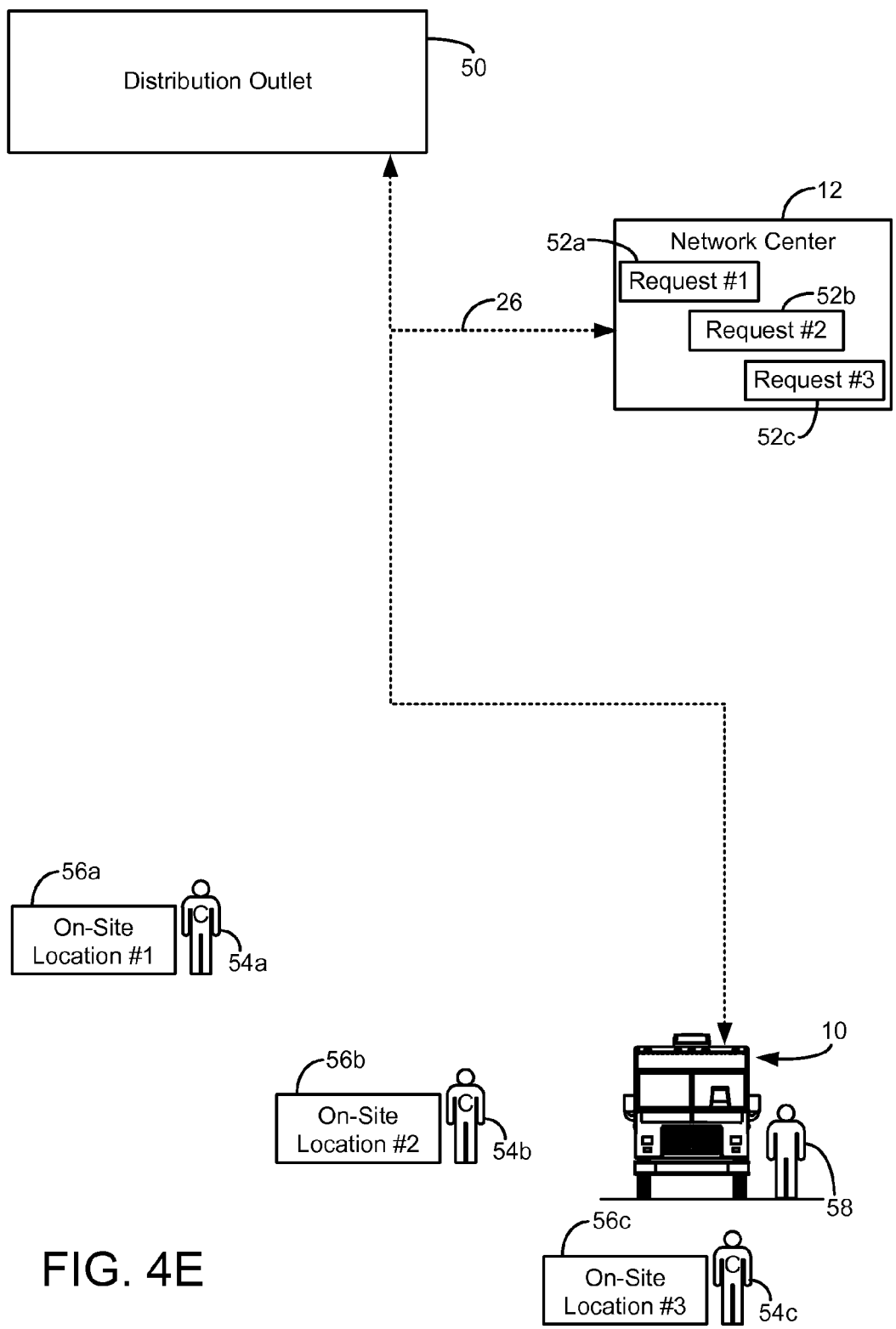

After the transaction is complete, retail associate 58 may then drive MRU 10 to on-site location 56b to deliver the ordered batch of paint 24 to customer 54b under purchase request 52b, as illustrated by arrow 64. As shown in FIG. 4D, the same process may be repeated for customer 56b and on-site location 54b. Then, after the transaction with customer 56b is complete, retail associate 58 may drive MRU 10 to on-site location 56c to deliver the ordered batch of paint 24 to customer 54c under purchase request 52c, as illustrated by arrow 66. As shown in FIG. 4E, the same process may be repeated for customer 56c and on-site location 54c.

Periodically, painters can underestimate the amount of paint required to paint a given building or structure. As such, one or more of customers, such as customer 54a, may contact network center 12 or retail associate 58 to purchase additional amounts of the ordered paint 24. Because computer 14 and/or customized-tint station 20 can retain the prescription for each of the finalized coating tints, retail associate 58 may begin preparing the additional requested amount of paint 24 for customer 54a while driving MRU 10 back to on-site location 56a. Upon arrival at on-site location 56a, retail associate 58 may then sell the additional amount of paint 24 to customer 54a. This can substantially reduce the down time that would otherwise be required if customer 54a had to drive to a local store to pick up the additional amount of paint. Instead, customer 54a can continue painting while MRU 10 transports the additional amount to on-site location 56a.

As mentioned above, in some embodiments, custom-tint station 20 and color scanner 22 may communicate with computer 14 over network adapter 42 or computer interface 44. In these embodiments, computer 14 may relay the prescription for each of the finalized coating tints to network center 12. This can be beneficial in situations where customer 54a requires an additional amount of paint 24, but retail associate 58 is unavailable to drive back to on-site location 56a, such as due to obligations to complete purchase requests 52b and 52c in a timely manner.

In this situation, network center 12 may provide the additional purchase request to a second retail associate 58, who may then complete the transaction, or the customer may pick up the additional paint from a local retail store (e.g., retail stores 51). In particular, network center 12 may relay the prescription of the finalized coating tint for customer 54a to the computer 14 of the MRU 10 operated by the second retail associate 58. The second retail associate 58 may then drive the MRU 10 to on-site location 56a, and begin preparing the additional requested amount of paint 24 for customer 54a. The second retail associate 58 may then sell the additional volume of paint 24 to customer 54a.

Network center 12, and the communication with multiple MRUs 10 and distribution outlets 50 over communication line 26, provides a convenient network (e.g., network 48) for providing customized, point-of-sale paints and other coating materials (and sundries) to on-site locations disposed around the United States (or world). Furthermore, climate-control system 16 in each MRU 10 allows MRUs 10 to effectively operate in any climate to reliably provide high-quality coating products to customers. This combination provides a convenient mechanism for finalizing the tint of paints and other coating materials, and allows multiple, successive swatches to be painted in a short amount of time, thereby utilizing the same or similar lighting conditions.

As can be appreciated, in some situations, a customer may know what paint tint and other characteristics are needed when submitting a purchase request. For instance, a professional painter may not necessarily require the paint tint to be customized in an on-demand manner at an on-site location. As such, the customer may identify the desired color and tint of the paint when submitting the purchase request. In this case, retail associate 58 may then just deliver the purchased paint to the on-site location without conducting an on-demand paint customization. In fact, as mentioned above, in this delivery case, a standard delivery vehicle other than an MRU 10 (e.g., a standard van or truck) may be used to deliver the paint. Accordingly, network 48 provides flexibility for customers having a variety of different painting requirements.

FIGS. 5-12 illustrate an example embodiment for MRU 10 having a box-truck configuration, which includes exterior frame 68, cabin 70, engine compartment 72, and wheel set 74, which may be conventional truck components. For example, frame 68 may be a mobile-vehicle frame with supporting chassis, such as a truck frame.

Figure 5:
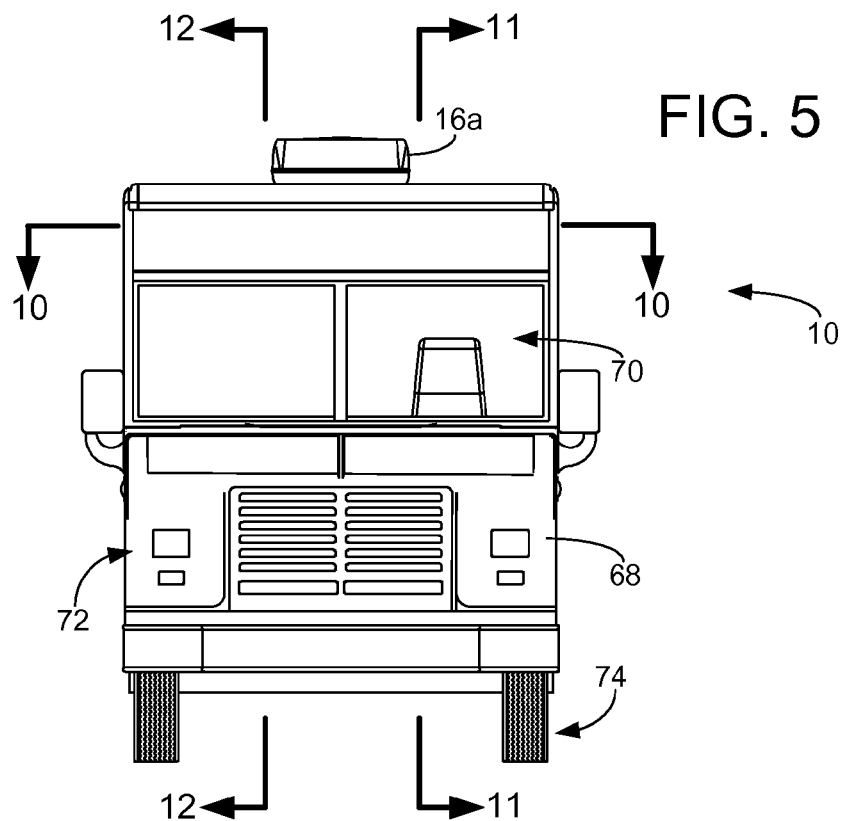
FIG. 5 is a front view of an example embodiment of the mobile retail unit, which has a box truck configuration.
Figure 6:
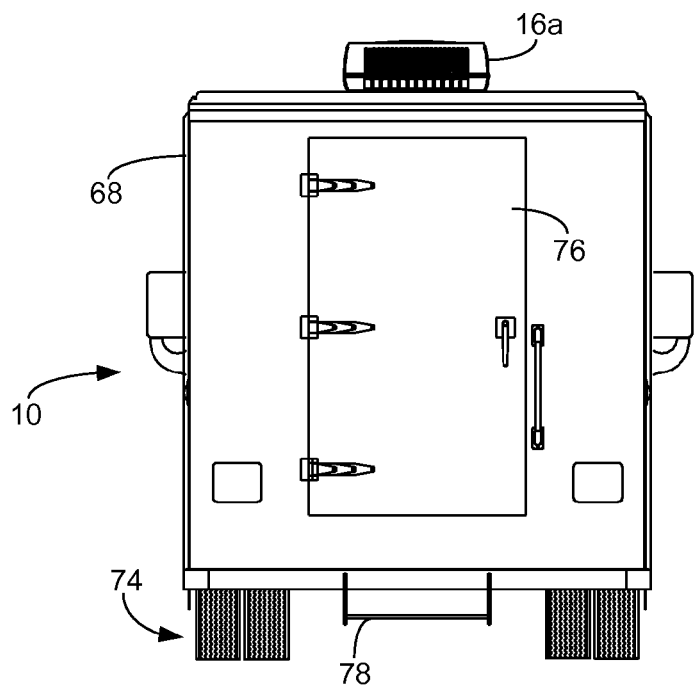
FIG. 6 is a rear view of the example embodiment of the box-truck mobile retail unit.

As shown in FIGS. 5 and 6 (and further illustrated in FIGS. 7-9), MRU 10 also includes one or more air-conditioning systems 16a secured to top side of frame 68. Air-conditioning systems 16a are configured to blow cooling air into the interior of frame 68 when operating. This maintains MRU 10 within an environmental window that preserves the shelf lives and usability of paint 24, as discussed above. To further assist in controlling the climate within MRU 10, frame 68 may include one or more thermally-insulating liners (thermal insulation 16c, not shown) within its chassis.

As further shown in FIG. 6, frame 68 may also include tail door 76 and bumper step 78 at the tail end for access to the interior of MRU 10. As shown in FIG. 7, on the right side of MRU 10, frame 68 may also include access doors 80 to provide access to battery farm 18a (not shown in FIG. 7). Frame 68 may also include an access port for shore line 18c adjacent to cabin 70 and engine compartment 72, as shown.

Additionally, MRU 10 includes heating system 16b, which, in the shown embodiment, is a fuel-powered heater for generating heat within the interior of frame 68, when needed. In particular, heating system 16b may draw and burn fuel from MRU 10 (or from an external source) to generate the heat. Examples of suitable fuel-powered heaters for heating system 16b include those commercially available under the trademark "ESPAR" from Espar, Inc., Mississauga, Ontario, Canada. In alternative embodiments, heating system 16b may be an electric heater that draws electrical power from battery farm 18a or shore line 18c.

As shown in FIG. 8, on the left side of MRU 10, frame 68 may also include access doors 82 to provide access to auxiliary generator 18b (not shown in FIG. 8). The low locations of access doors 80 and 82 are convenient for ease of maintenance or replacement of battery farm 18a and auxiliary generator 18b. They also allow battery farm 18a and auxiliary generator 18b to be retained at a central location and low elevation along frame 68, which can preserve the stability of MRU 10 while moving.

FIG. 9 is a top view of MRU 10, and FIG. 10 illustrates a top view of the interior of MRU 10, as taken along section line 10-10 in FIG. 5. The interior of MRU 10, within frame 68, may be divided into cabin 70 and working area 84. As shown, cabin 70 is partially separated from working area 84 with bulkheads 86 and 88, where working area 84 is accessible from cabin 70 and tail door 76, and includes central corridor 85 between the left and right sides of MRU 10. MRU 10 may also include lighting system 19 (not shown in FIGS. 5-12), which may include one or more light panels configured to emit light into working area 84, and optionally, into cabin 70.

Within cabin 70, MRU 10 includes driver seat 90, and may also include foldable jump seat 92. Within working area 84 and along its left side, MRU 10 may include office station 94, storage units 96, workstation 98, one or more mixers 20b, and one or more storage bins 100. Similarly, within working area 84 and along its right side, MRU 10 may also include storage units 102, storage or display section 104, workstation 106, and colorant dispenser 20a.

The rear section of working area 84 may also include a grated floor 108 to allow any paint that accidentally spills to flow therethrough. This increases safety while retail associate 58 works within working area 84. In some embodiments, MRU 10 may also include an extendable rear ramp (not shown) that may be pulled out of the tail end of MRU 10 for ease of access to tail door 76. When not in use (e.g., during transit), the rear ramp may be stowed in a slot below grated floor 108.

Storage units 96 and 102 are bulkhead-separated shelving units for storing containers of paint 24. The bulkhead separation between adjacent storage units 96 and 102 increases the structural integrity of MRU 10, and preferably prevents the shifting of stored items (e.g., paint 24) during transit.

The arrangement shown in FIG. 10 is suitable for laterally balancing the weight of MRU 10, which stabilizes MRU 10 while moving. In particular, coating storage units 96 and 102 preferably have the substantially same volumes to balance the storage weight of paint 24. Similarly, the heavier equipment, such as colorant dispenser 20a and mixers 20b are preferably located on opposing lateral sides of MRU 10, as shown. This also balances the weight of MRU 10.

Moreover, coating storage units 96 and 102 are preferably located axially along MRU 10 between the front and rear wheels of wheel set 74 to reduce overloading the nose or tail ends of MRU 10. This overload reduction also assists in balancing MRU 10, and may also reduce wear on wheel set 74.

Figure 11:
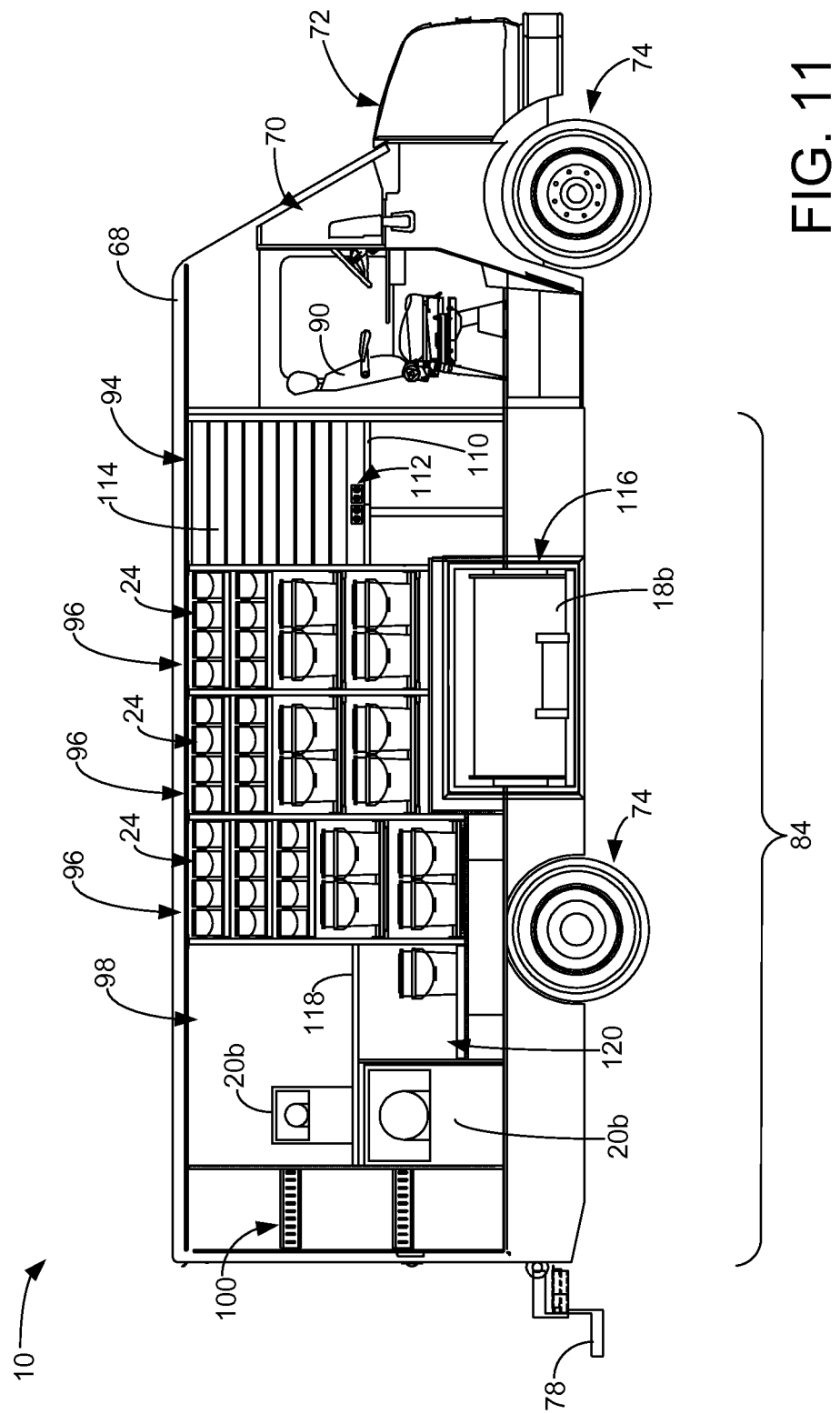
FIG. 11 is a sectional view of section 11-11 taken in FIG. 5, showing a left side of the interior of the box-truck mobile retail unit.

As shown in FIG. 11, office station 94 includes desk 110 (also shown in FIG. 10), outlet ports 112, and storage wall 114, and is a suitable location for retail associate 58 to operate computer 14, to review the purchase requests, and to conduct related business. Outlet ports 112 are electrical outlets for relaying electrical power from battery farm 18a to charge one or more portable devices, such as computer 14, color scanner 22, inventory scanner 46, and any other suitable device (e.g., a mobile phone). Storage wall 114 is a slatwall or other suitable feature for storing office supplies, tools, sundries, and the like for easy access within office station 94.

In the shown embodiment, office station 94 is located adjacent to cabin 70, allowing retail associate 58 to maneuver between cabin 70 and office station 94 without having to move through the rest of working area 84. This increases the convenience of conducting business in office station 94, as well as reducing the risk of spilling paint 24 within office station 94.

Storage units 96 may include different numbers of shelves for storing different-sized paint containers. For example, one or more of storage units 96 may include shelves that are adjustable in height to accommodate a variety of different-sized paint containers. In the shown example, each storage unit 96 includes lower shelves that are set to accommodate large paint containers (e.g., five-gallon containers), and higher shelves that are set to accommodate small paint containers (e.g., one-gallon containers). However, storage units 96 may be set to accommodate paint containers (or other coating containers) of a variety of different sizes. In preferred embodiments, the shelves of storage units 96 are configured to permit easy loading and unloading of the containers of pain 24, but also to resist shifting of the containers during transit. For example, front-to-back slots may be configured in the shelves to resist side-to-side sliding of the containers. Additionally, restraints (e.g., gates, cords, ties, and the like), spring-loaded pushers, and/or inclines may be used to keep the containers from sliding off of the shelves.

The containers of paint 24 stored in storage units 96 may be organized by type or other desired arrangement. For example, the front two storage units 96 may be used to store exterior paints and primers, and the rear-most storage units 96 may be used to store paints to fulfill upcoming purchase requests.

As further shown in FIG. 11, MRU 10 also includes compartment 116, located below storage units 96, and between the front and rear wheels of wheel set 74. Compartment 116 retains auxiliary generator 18b and is accessible via access doors 82 (shown in FIG. 8).

Workstation 98 includes countertop 118 (also shown in FIG. 10) and storage compartment 120. Countertop 118 is a convenient working countertop for preparing paint 24 for purchase. Storage compartment 120 is an additional location to temporarily store containers of paint 24 or other items (e.g., a waste bin). Countertop 118 also vertically separates mixers 20b, where the lower mixer 20b is a larger paint shaker (e.g., for five-gallon containers) located adjacent to storage compartment 120. The top-most mixer 20b is a smaller paint shaker (e.g., for one-gallon containers) secured to countertop 118, above the larger mixer 20b. Storage bins 100 are containers for storing various items, such as paint containers, tools, sundries, and the like. Alternatively, tools, sundries, and other small articles may be affixed (e.g., using clips or elastic ties) to the ceiling of MRU 10.

As mentioned above, lighting system 19 may further be combined with one or more areas of MRU 10 having a neutral gray background. For example, workstation 98 (or any other suitable location of working area 84) may have neutral gray walls, ceilings, desktops, enclosures, and the like (e.g., a color booth). This can provide true renditions of color to assist in viewing paint tints, such as when mixing paints with mixers 20b.

Figure 12:
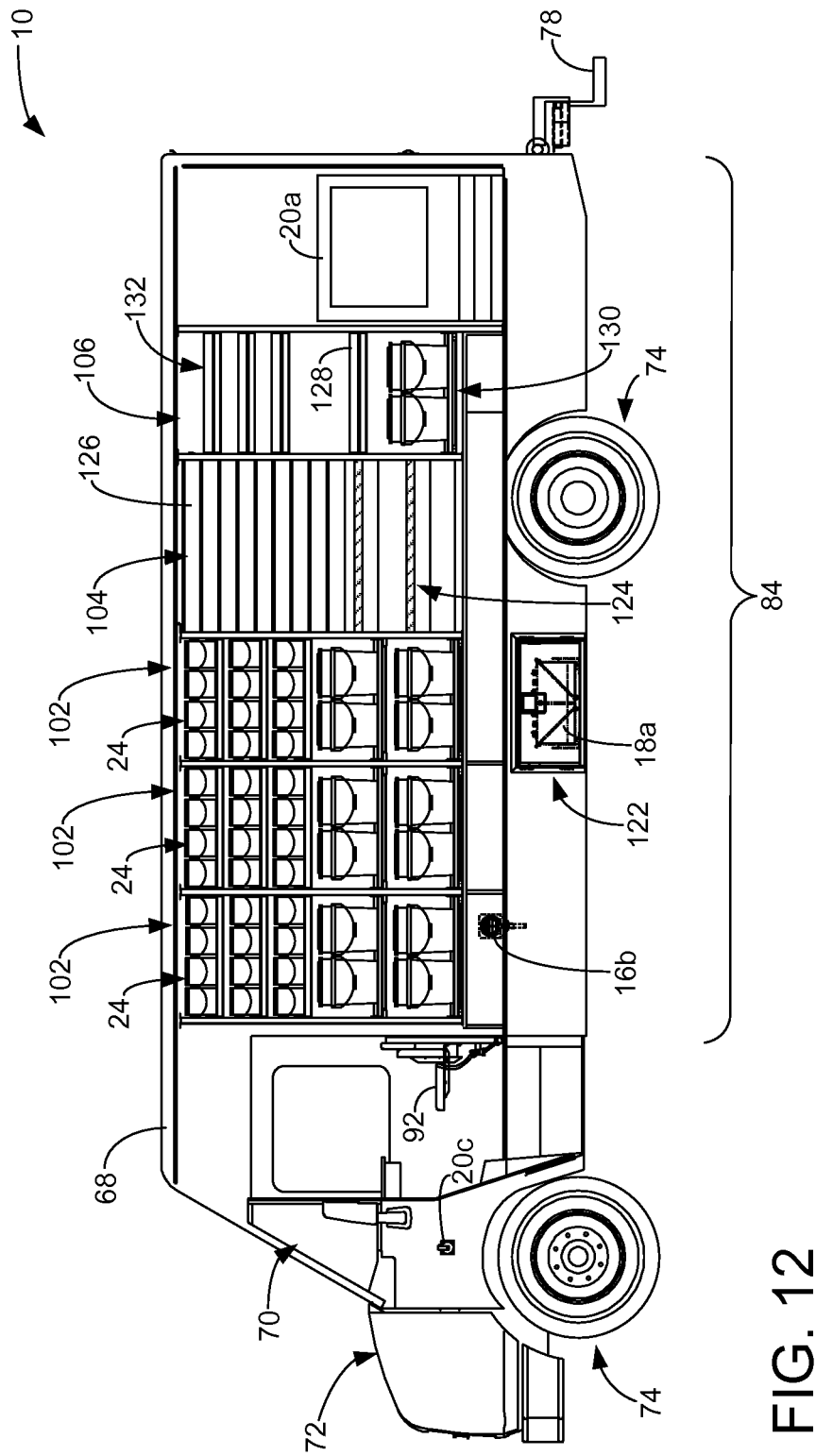
FIG. 12 is a sectional view of section 12-12 taken in FIG. 5, showing a right side of the interior of the box-truck mobile retail unit.

As shown in FIG. 12, storage units 102 may also include different numbers of shelves for storing different-sized paint containers in the same manner as storage units 96. The containers of paint 24 stored in storage compartments 102 may also be organized by type or other desired arrangement, such for interior paints and primers.

MRU 10 also includes compartment 122, located below storage units 102, and is adjacent to compartment 116 (shown in FIG. 11). Compartment 122 retains battery farm 18a and is accessible via access doors 80 (shown in FIG. 7).

Display section 104 include a shelving unit 124 (also shown above in FIG. 10) for displaying or otherwise retaining a variety of items. Above shelving unit 124, MRU 10 may also include a second storage wall 126, such as a second slatwall for storing tools and sundries.

Workstation 106 is a second workstation, located opposite of workstation 98. Workstation 106 includes countertop 128, storage compartment 130, and shelving unit 132 (also shown above in FIG. 10). Countertop 128 is also a convenient working countertop for preparing paints 24 for purchase. Storage compartment 130 and shelving unit 132 are additional locations to store containers of paint 24 or other items. Color dispenser 20a is located next to workstation 106 and is generally opposite of mixers 20b to laterally distribute their weights, as discussed above.

As mentioned above, MRU 10 preferably includes a power management tool to balance electrical power distributions, such as between air-conditioning systems 16a, color dispenser 20a, mixers 20b, and optionally with light system 19. This accordingly allows auxiliary generator 18b to be smaller and less expensive.

MRU 10, as shown in the example embodiment of FIGS. 5-12, includes many beneficial features to function as a mobile platform for delivering and selling paints and other coating materials. In addition to the above-discussed convenience for customers, MRU 10 also includes features that are attractive for retail associates that operate as licensed franchisees. First, MRU 10 is convenient and efficient to operate. Office station 94 is convenient for a retail associate to conduct business, and working area 84 is intuitively organized for efficient mixing and productions of paints.

Furthermore, MRU 10 does not require retail associates to purchase or rent expensive climate-controlled external garages to park MRU 10 or to store the paints and other coating materials. Although, MRU 10 may be stored in a garage, if desired, such as to protect MRU 10 from inclement weather conditions (e.g., storms). Instead, air-conditioning systems 16a and heating system 16b function as a climate-control system, allowing MRU 10 to be parked for extended durations in a variety of different environmental conditions, as discussed above.

Figure 13:
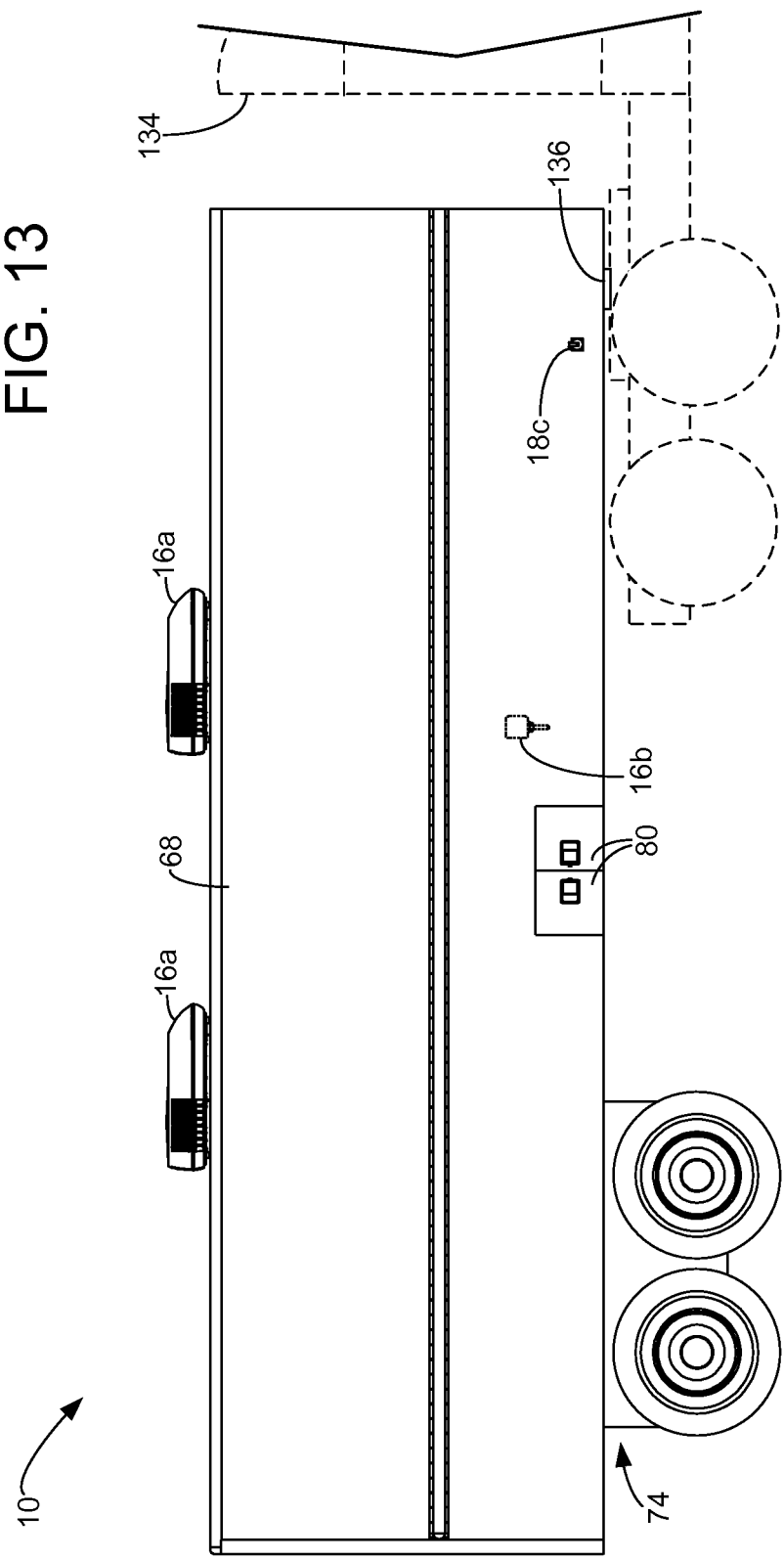
FIG. 13 is a right side view of a second example embodiment of the mobile retail unit, which has a semi-trailer configuration.
Figure 14:
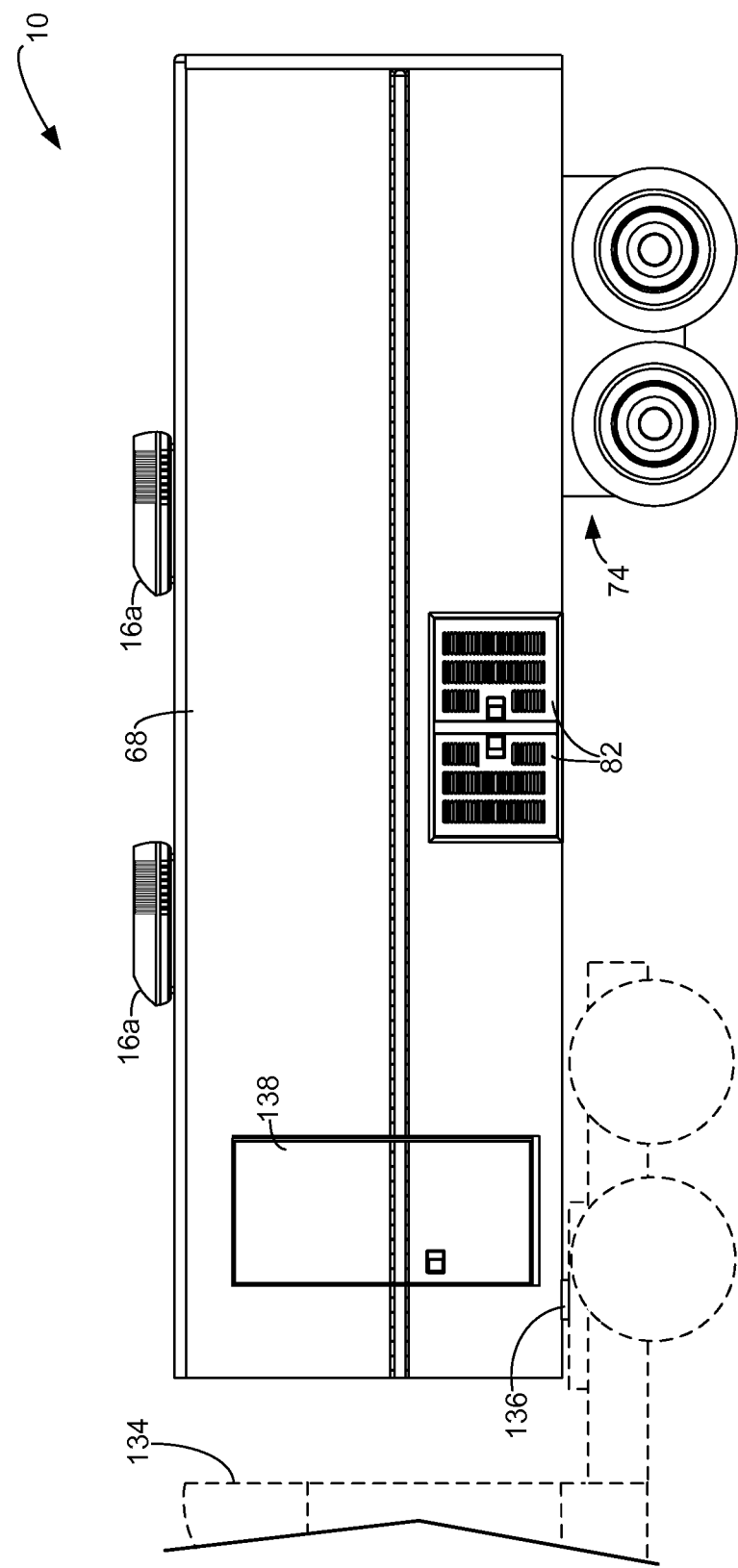
FIG. 14 is a left side view of the example embodiment of the semi-trailer mobile retail unit.
Figure 15:
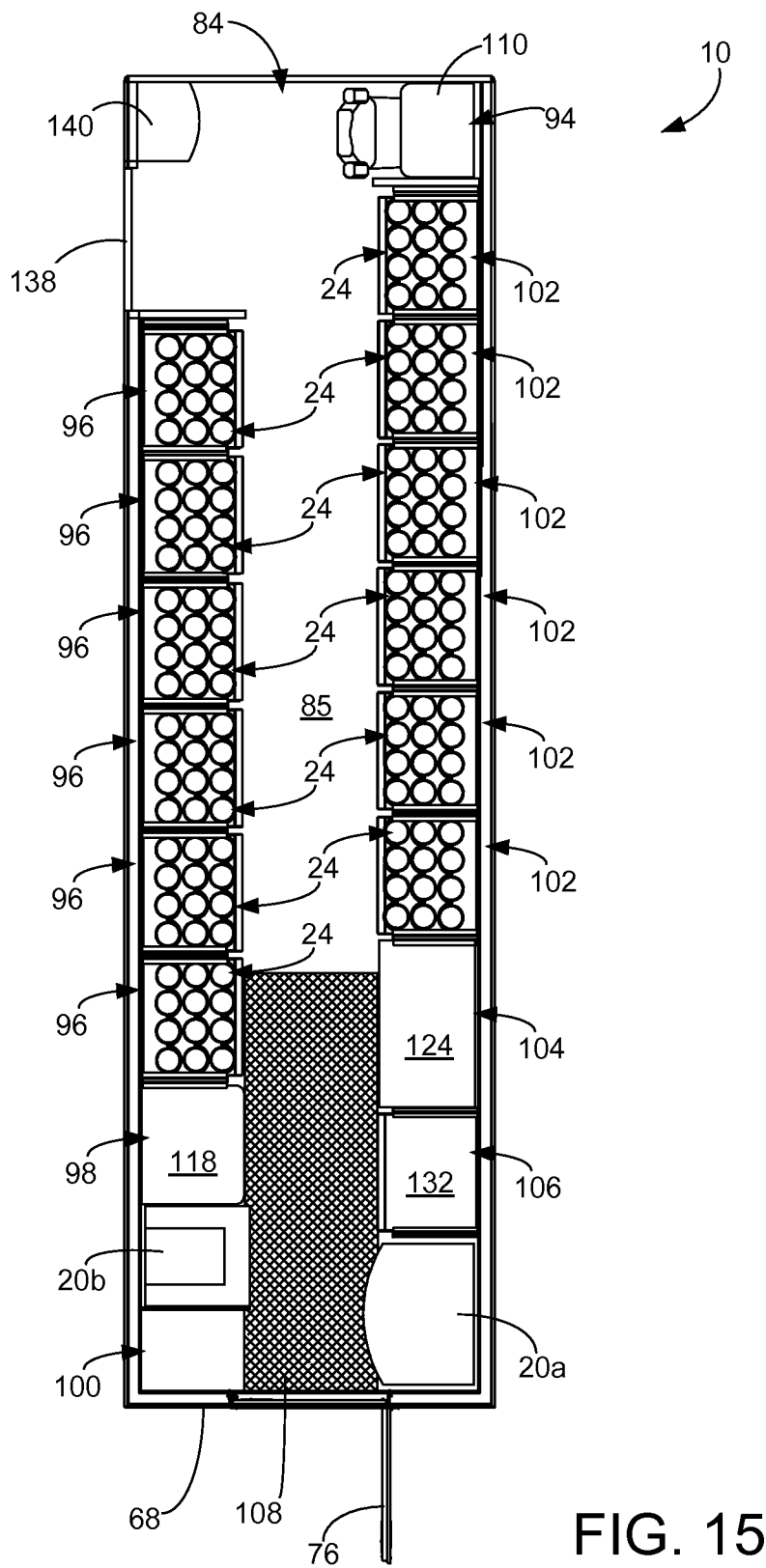
FIG. 15 is a sectional view corresponding to section 10-10 taken in FIG. 5, showing a bottom portion of an interior of the semi-trailer mobile retail unit shown in FIGS. 13 and 14.

FIGS. 13-15 illustrate another example embodiment for MRU 10, which has a semi-trailer configuration for use with a separate semi cab or other tractor unit 134 (shown with dashed lines). MRU 10 in this example is an extended variation of the box truck configuration shown above in FIGS. 5-12, but otherwise preferably includes the same beneficial features to function as a mobile platform for delivering and selling paints and other coating materials. In this case, MRU 10 is suitable for large delivery operations, as well as for being deployed at on-site locations for extended periods of time (e.g., multiple days or weeks). Because of this potential use, air-conditioning system 16a, heating system 16b, thermal insulation 16c (not shown), and/or vent(s) 16d (not shown) preferably maintain a suitable climate control for MRU 10 when needed, even when decoupled from an associated semi cab 134.

As shown in FIG. 13, MRU 10 in this embodiment may include substantially the same features as discussed above for the box tuck configuration (shown in FIGS. 5-12), and may also include kingpin coupling 136 (for a fifth-wheel coupling with the semi cab 134) and a landing gear (not shown). The landing gear is one or more retractable legs configured to support MRU 10 in a level orientation when decoupled from the semi cab 134.

As further shown, MRU 10 includes shore line 18c for receiving electrical power from an external source when MRU 10 is parked, as well as access doors 80 to provide access to battery farm 18a in compartment 122 (not shown in FIG. 13). Battery farm 18a and/or shore line 18c preferably provide electrical power to the systems of MRU 10 when decoupled from the semi cab 134. This allows MRU 10 to remain deployed at an on-site location, while allowing the semi cab to be free for other tasks. For instance, a single semi cab may be associated with multiple MRUs 10, where the semi cab 134 may transport and deploy the MRUs 10 to various on-site locations.

In some embodiments, MRU 10 may also include one or more electrical lines or couplings (not shown) to receive electrical power from the associated semi cab 134. Moreover, as shown in FIG. 14, on the left side of MRU 10, frame 68 may also include access doors 82 to provide access to auxiliary generator 18b in compartment 116 (not shown in FIG. 14). As such, MRU 10 may also receive electrical power from auxiliary generator 18b, which may be fueled by the semi cab or with an auxiliary fuel tank (not shown) retained by MRU 10 or present at an on-site location.

As discussed above, the low locations of access doors 80 and 82 are convenient for ease of maintenance or replacement of battery farm 18a and auxiliary generator 18b. They also allow battery farm 18a and auxiliary generator 18b to be retained at a central location and low elevation along frame 68, between wheel set 74 and kingpin coupling 136, which can preserve the stability of MRU 10 while moving and during deployment. As further shown in FIG. 14, MRU 10 may also include side-entry door 138, which provides access to MRU 10 in addition to tail doors 76 (shown in FIG. 15).

FIG. 15 illustrates a top view of the interior of MRU 10 of this embodiment. As shown, MRU 10 with this semi-trailer configuration is similar to that of the above-discussed box truck configuration, but does not include cabin 70 (shown above in FIGS. 5-12), and is extended in length to accommodate a greater storage volume. For instance, MRU 10 with the trailer design may include additional storage units 96 and 102 for storing containers of paint 24. As mentioned above, the bulkhead separation between adjacent storage units 96 and 102 increases the structural integrity of MRU 10, and preferably prevents the shifting of stored items (e.g., paint 24) during transit.

The arrangement shown in FIG. 15 is suitable for laterally balancing the weight of MRU 10, which stabilizes MRU 10 while moving and during deployment. In particular, coating storage units 96 and 102 preferably have the substantially the same volumes to balance the storage weight of paint 24. Similarly, the heavier equipment, such as colorant dispenser 20a and mixers 20b are preferably located on opposing lateral sides of MRU 10, as shown.

Moreover, coating storage units 96 and 102 are preferably located axially along MRU 10 between kingpin coupling 136 and wheel set 74 (shown in FIGS. 13 and 14) to reduce overloading the nose or tail ends of MRU 10. This overload reduction also assists in balancing MRU 10, and may also reduce wear on wheel set 74. As can be appreciated, the number of storage units 96 and 102 may vary depending on the length of MRU 10, where a longer MRU 10 may store a larger supply of paint 24, such as for extended deployments.

Office station 94 includes desk 110, which is a suitable location for retail associate 58 to operate computer 14, to review the purchase requests, and to conduct related business. Office station 94 may also include outlet ports, storage walls, and any other suitable mobile office equipment, furniture, and accessories.

MRU 10 may also include table 140, which is a side table adjacent to office station 94 and side-entry door 138, and which may be replaced with a variety of different units, such as additional storage bins. In some embodiments, MRU 10 may include a control panel (not shown) at the locations of office station 94 and/or table 140, which allows retail associate 58 to control the various electrical systems of MRU 10 (e.g., climate-control system 16 and light system 19). MRU 10 of this embodiment may also include workstation 98, one or more mixers 20b, one or more storage bins 100, storage or display section 104, workstation 106, and colorant dispenser 20a, as described above for the box-truck configuration MRU 10.

Figure 16:
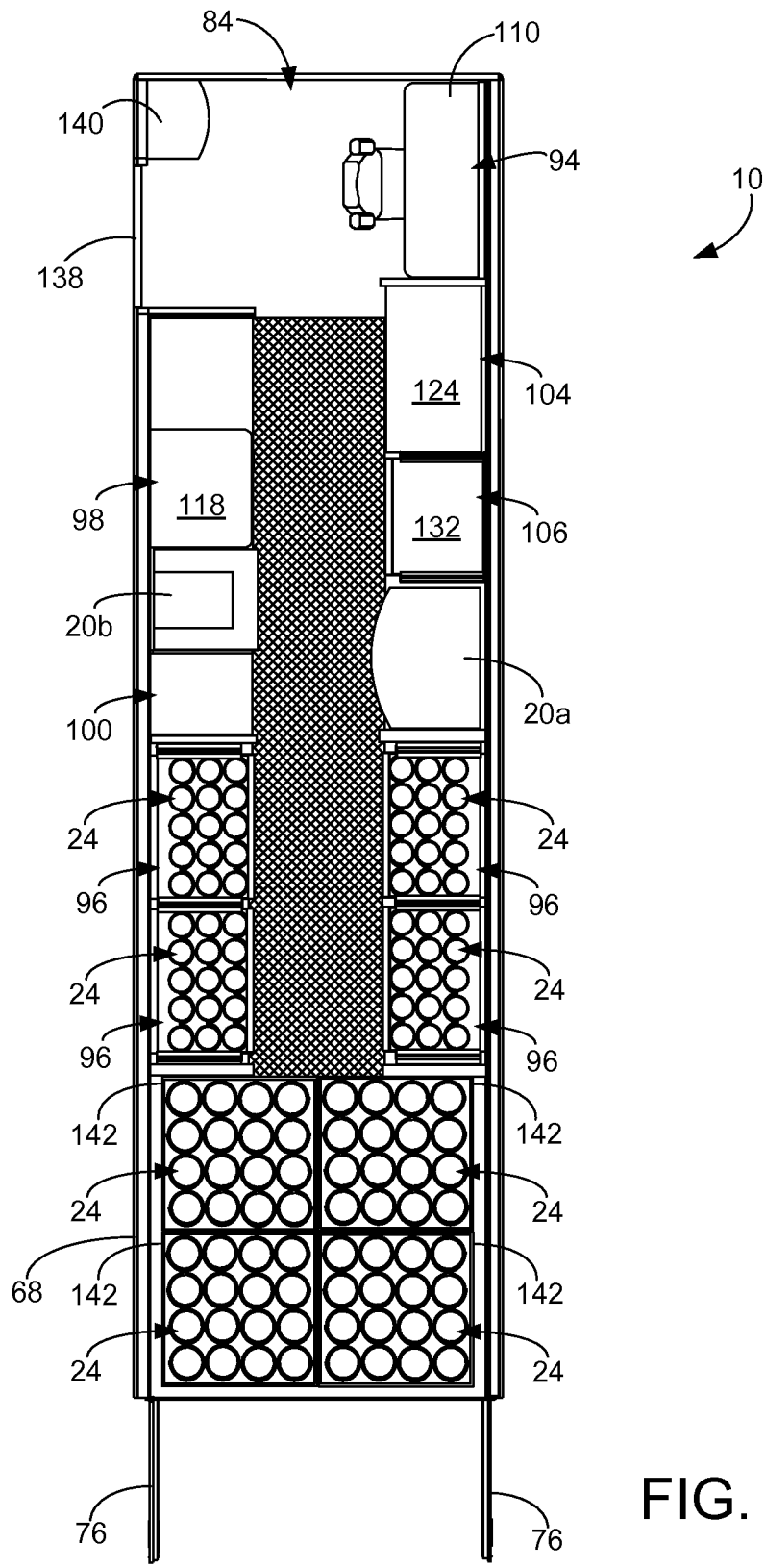
FIG. 16 is a sectional view corresponding to section 10-10 taken in FIG. 5, showing a bottom portion of an interior of the semi-trailer mobile retail unit shown in FIGS. 13 and 14 with an alternative interior arrangement.

FIG. 16 illustrates an alternative arrangement to that shown in FIG. 15, which is set up for large delivery operations. In this embodiment, working area 84 is located in the front half of MRU 10, allowing multiple pallets 142 of paint 24 (e.g., in 5-gallon containers) to be loaded and unloaded via tail doors 76. Preferably, multiple rows of paint 24 and/or pallets 142 are stacked on top of each other to optimize the storage volume of MRU 10.

Figure 17:
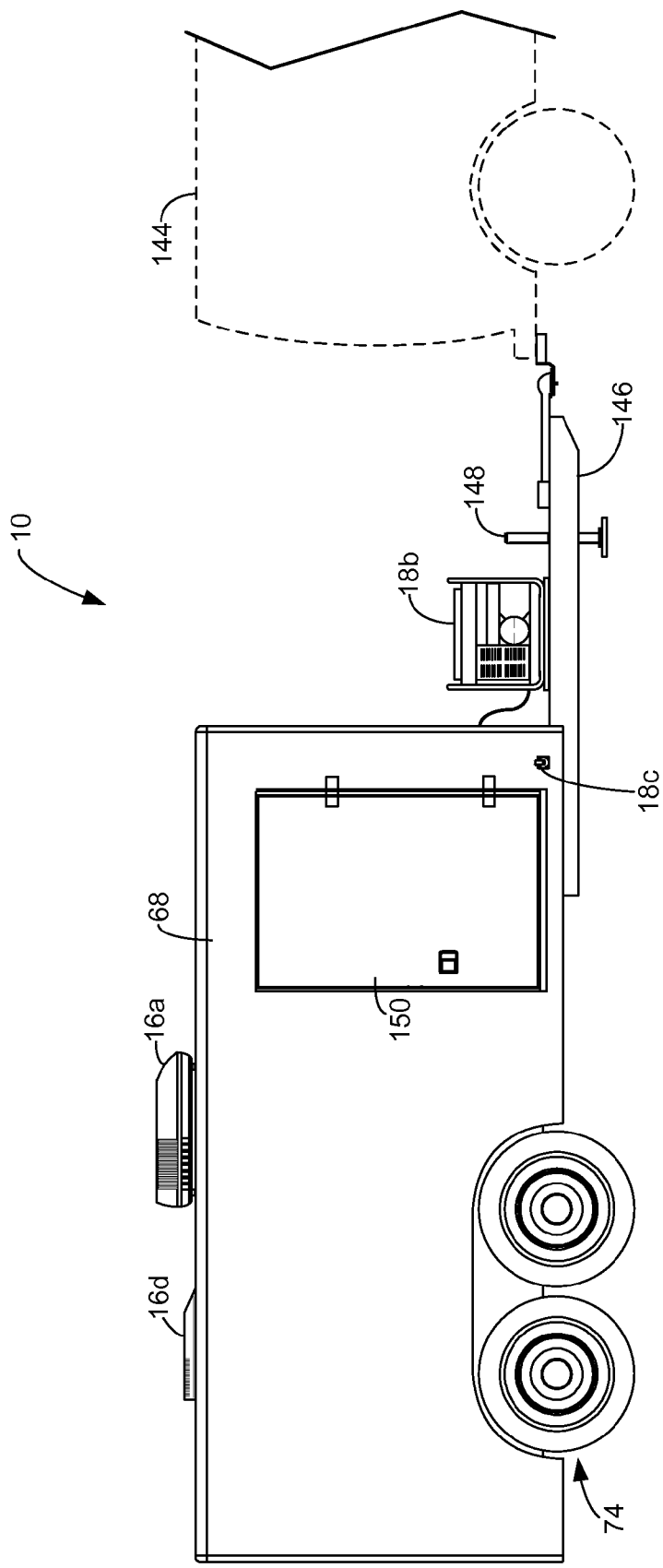
FIG. 17 is a right side view of a third example embodiment of the mobile retail unit, which has a pull-behind trailer and small panel van configuration.

FIGS. 17-10 illustrate another example embodiment for MRU 10, which has a pull-behind configuration for use with a separate panel van 144 (shown with dashed lines) or other suitable vehicle (e.g., a pickup truck). As shown in FIG. 17, MRU 10 in this embodiment is suitable for delivery operations, as well as for being deployed at on-site locations, and is towable by panel van 144 with towing harness 146. MRU 10 may also include foldable jack stand 148, which is configured to support MRU 10 in a level orientation when decoupled from the van 144.

MRU 10 may also include one or more of air-conditioning system 16a, heating system 16b (not shown), thermal insulation 16c (not shown), and/or vent(s) 16d to maintain a suitable climate control for MRU 10 when needed, even when decoupled from an associated van 144. MRU 10 with this pull-behind trailer configuration may also mount auxiliary generator 18b onto towing harness 146 such that auxiliary generator 18b may be removable if desired. MRU 10 also includes shore line 18c for receiving electrical power from an external source when MRU 10 is parked, and may also include an auxiliary line (not shown) for receiving electrical power from van 144.

Figure 18:
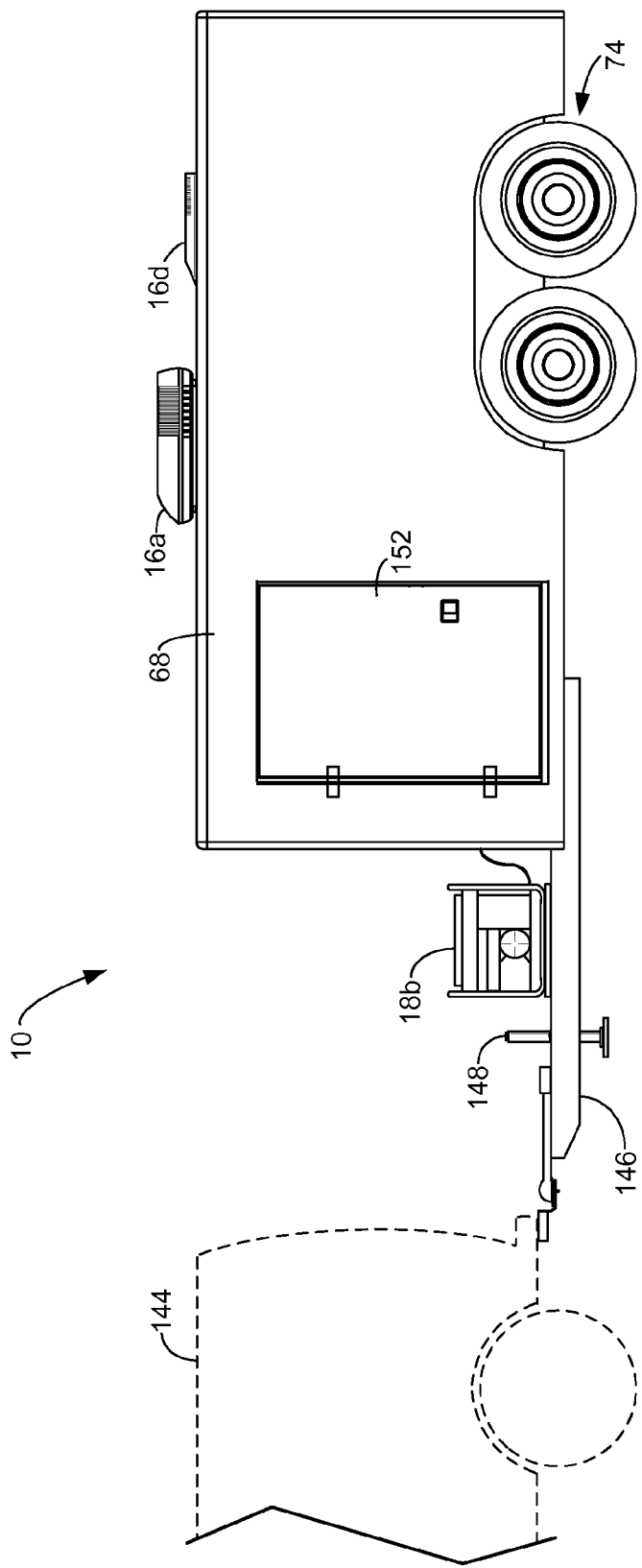
FIG. 18 is a left side view of the example embodiment of the pull-behind trailer mobile retail unit.

MRU 10 may also include side-entry door 150, which provides access to the right side of MRU 10, and as shown in FIG. 18, side-entry door 152, which access to the left side of MRU 10, in addition to tail doors 76. In some embodiments, MRU 10 with this pull-behind trailer configuration may have an interior arrangement corresponding to that of the box-truck MRU 10 (shown in FIGS. 10-12). In these embodiments, a retail associate may work inside of MRU 10 as discussed above to deliver paints and/or to provide substantially on-demand customizations of paints.

Figure 19:
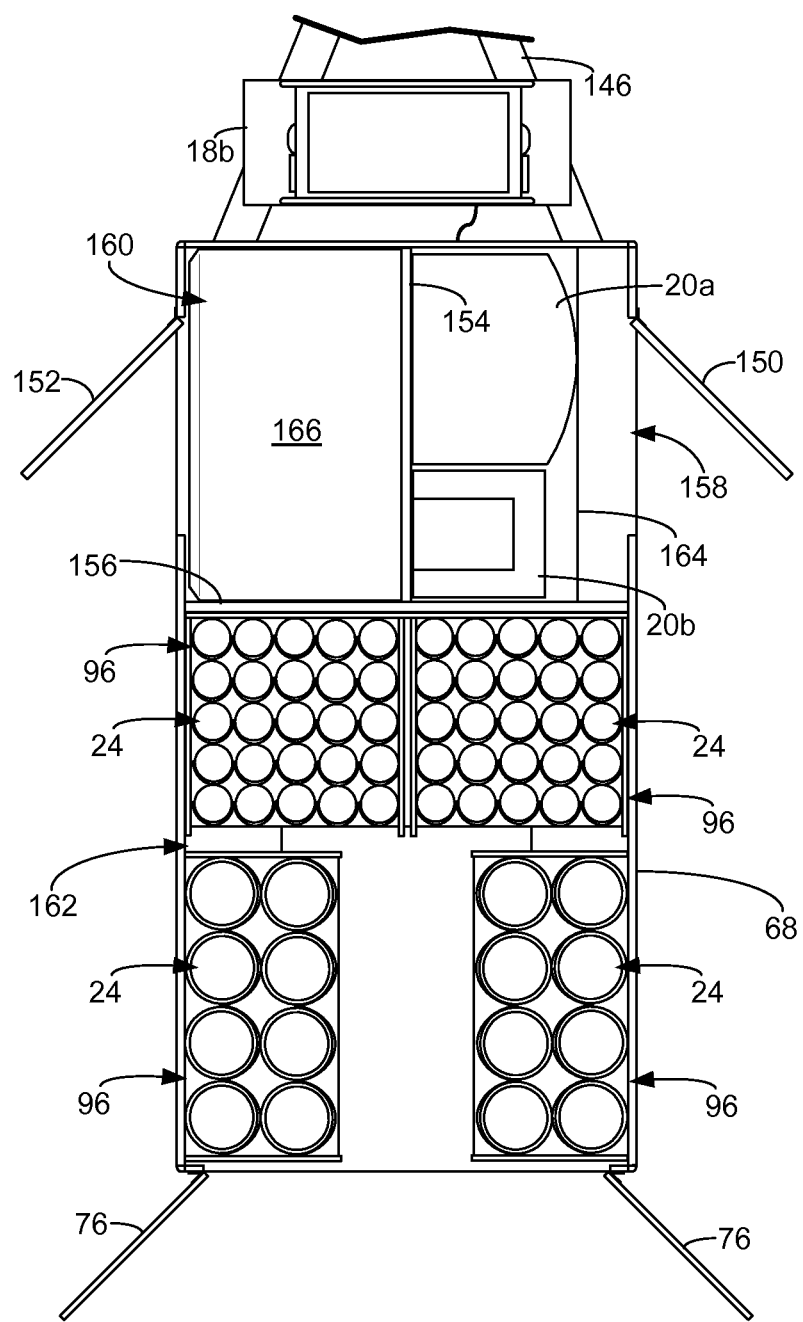
FIG. 19 is a sectional view corresponding to section 10-10 taken in FIG. 5, showing a bottom portion of an interior of the pull-behind trailer retail unit shown in FIGS. 17 and 18.

Alternatively, as shown in FIG. 19, the interior of MRU 10 may be subdivided with one or more partition walls 154 and 156 into one or more compartments, such as working compartments 158 and 160, and storage compartment 162. In the shown example, working compartments 158 and 160 are respectively accessible by side-entry doors 150 and 152, where the retail associate or other user may reach into working compartments 158 and 160 to use the equipment retained therein.

For example, working compartment 158 on the right side of MRU 10 may include a countertop 164, which may retain one or more colorant dispensers 20a and mixers 20b. The additional space below countertop 164 may also be utilized for storage purposes. On the left side of MRU 10, working compartment 160 may include color booth 166 having a neutral gray background, such as neutral gray walls, desks, and the like, which can provide true renditions of color, optionally in association with lighting system 19.

Storage compartment 162 may retain multiple storage units 96 for retaining various-sized containers of paint 24, allowing MRU 10 of this embodiment to be deployed for multiple days, if needed. As mentioned above, air-conditioning system 16a, heating system 16b (not shown), thermal insulation 16c (not shown), and/or vent(s) 16d may maintain a suitable climate control for MRU 10 when needed, even when decoupled from an associated van 144. For instance, the walls, ceiling, and/or floor of exterior frame 68 may include thermal insulation 16c to keep the interior of MRU 10, storage compartment 162 in particular, within a suitable environmental window for paint 24 even when MRU 10 is exposed to extreme conditions overnight, as discussed above.

The above-discussed examples of MRU 10 (e.g., a box truck configuration shown in FIGS. 5-12, a semi-trailer configuration shown in FIGS. 13-16, and a pull-behind trailer configuration shown in FIGS. 17-19) illustrate suitable layouts based on their respective dimensions. Each MRU 10 preferably has a balanced weight laterally and optionally along its length, which stabilizes MRU 10 while moving and during deployment. Additionally, the shown layouts provide convenient working environments for preparing paint samples, performing on-demand paint customizations, completing purchase requests, and/or delivering paints.

The combination of MRU 10 with network center 12 and distribution outlet 50 may also reduce the logistics that the retail associates are required to manage, such as organizing and delegating the purchase requests for deliveries and resupplying the distribution outlet 50. These features allow the retail associates to efficiently operate MRU 10 to transport and provide customized, point-of-sale paints or other coating materials (and sundries) to on-site locations.

Although the present disclosure has been described with reference to preferred embodiments, workers skilled in the art will recognize that changes may be made in form and detail without departing from the spirit and scope of the disclosure.

The invention claimed is:

1. A mobile retail unit for use with a remote network center that is associated with a plurality of vehicles, wherein the mobile retail unit comprises:
 a mobile-vehicle frame having an interior;
 a plurality of storage units disposed within the interior of the mobile-vehicle frame, and configured to retain containers of coating materials;
 one or more customized-tint stations disposed within the interior of the mobile-vehicle frame;
 a climate-control system configured to maintain the interior of the mobile-vehicle frame within an environmental window to preserve the retained coating materials from temperature extremes during storage and transportation in the mobile retail unit, wherein the climate-control system comprises:
  an air conditioning system configured to deliver cooling air into the interior of the mobile-vehicle frame; and
  a heating system configured to deliver heat into the interior of the mobile-vehicle frame;
 a power system configured to provide electrical power to the one or more customized-tint stations, the climate-control system, and optionally one or more additional devices of the mobile retail unit, wherein the power system comprises:
  an auxiliary generator configured to generate the electrical power;
  a shore line configured to receive the electrical power from an external source;
  optionally one or more rechargeable batteries; and
  a power management tool configured to balance distribution of the electrical power between at least the one or more customized-tint stations and the climate-control system to limit a total electrical power consumption when not receiving the electrical power over the shore line such that the climate-control system maintains the interior of the mobile-vehicle frame within the environmental window at least while the mobile retail unit retains the coating materials; and
 a computer-based system comprising:
  a processor;
  at least one storage medium configured to retain inventory information relating to the retained coating materials;
  a global positioning system (GPS) receiver configured to generate location information for the mobile retail unit; and
  a network adapter configured to relay the inventory information and the location information over a wireless network to the remote network center.

2. The mobile retail unit of claim 1, wherein the climate-control system further comprises thermal insulation configured to thermally insulate at least a portion of the interior of the mobile-vehicle frame.

3. The mobile retail unit of claim 1, and further comprising:
 a cabin; and
 an office station integrally connected with and located rearwardly from the cabin, wherein at least a portion of the plurality of storage units are located adjacent to and rearwardly of the office station, and wherein the one or more customized-tint stations are located adjacent to and rearwardly of the plurality of storage units.

4. The mobile retail unit of claim 3, and further comprising:
 a central corridor extending rearwardly from the cabin adjacent to the office station, to the plurality of storage units, and to the one or more customized-tint stations; and
 a grated floor located along the central corridor adjacent to at least the one or more customized-tint stations;
 wherein the plurality of storage units comprise:
  first storage units disposed adjacent to a first lateral side of the central corridor; and
  second storage units disposed adjacent to a second lateral side of the central corridor that is opposite of the first lateral side, wherein the first storage units and the second storage units have substantially the same storage volumes.

5. The mobile retail unit of claim 1, wherein the one or more customized-tint stations comprise:
 a colorant dispenser; and
 a mixer, wherein the colorant dispenser and the mixer are disposed on opposing lateral sides within the interior of the mobile-vehicle frame.

6. The mobile retail unit of claim 1, wherein the computer-based system comprises a portable computer-based system configured to function as a color scanner, an inventory scanner, or a combination thereof.

7. The mobile retail unit of claim 1, and further comprising a lighting system configured to simulate one or more lighting conditions within the interior of the mobile-vehicle frame.

8. A system for distributing coating materials, the system comprising:
 one or more distribution outlets configured to store a supply of coating materials;
 a plurality of mobile retail units, wherein at least a portion of the plurality of mobile retail units each comprise:
  storage units configured to retain coating materials that are loaded from the supply of coating materials in at least one of the distribution outlets;
  one or more customized-tint stations;
  a climate-control system configured to maintain an environmental window within the mobile retail unit to preserve the retained coating materials from temperature extremes during storage and transportation in the mobile retail unit, wherein the climate-control system comprises:
   an air conditioning system configured to deliver cooling air into an interior of the mobile retail unit; and
   a heating system configured to deliver heat into the interior of the mobile retail unit;
  a power system comprising:
   one or more electrical sources; and
   a power management tool configured to balance distribution of electrical power from the one or more electrical sources between the one or more customized-tint stations, the climate-control system, and optionally one or more additional devices of the mobile retail unit to limit a total electrical power consumption such that the climate-control system maintains the interior of the mobile retail unit within the environmental window at least while the mobile retail unit retains the coating materials; and a computer-based system comprising:
  a processor;
  at least one storage medium configured to retain inventory information relating to the retained coating materials;
  a global positioning system (GPS) receiver; and
  a network adapter configured to transmit the inventory information and location information from the GPS receiver; and a network center configured to communicate with the computer-based system of each mobile retail unit to receive the transmitted inventory information and location information, and to provide purchase requests and associated location addresses to computer-based systems of particular mobile retail units based on the received inventory information and location information.

9. The system of claim 8, wherein at least one of the mobile retail units further comprises a lighting system configured to simulate one or more lighting conditions within an interior of the mobile retail unit.

10. The system of claim 8, wherein the one or more electrical sources comprise an auxiliary generator configured to generate the electrical power.

11. The system of claim 8, wherein the climate-control system further comprises thermal insulation configured to thermally insulate at least a portion of the interior of the mobile-vehicle frame.

12. The system of claim 8, wherein at least one of the mobile retail units further comprises:
  a cabin; and
  an office station integrally connected with and located rearwardly from the cabin, wherein at least a portion of the storage units are located adjacent to and rearwardly of the office station, and wherein the one or more customized-tint stations located adjacent to and rearwardly of the storage units.

13. The system of claim 12, wherein the at least one mobile retail unit further comprises:
  a central corridor extending rearwardly from the cabin adjacent to the office station, to the plurality of storage units, and to the one or more customized-tint stations; and
  a grated floor located along the central corridor adjacent to at least the one or more customized-tint stations.

14. A method for distributing coating materials, the method comprising:
  loading coating materials from one or more distribution outlets to a plurality of mobile retail units associated with a network center;
  relaying inventory information of the loaded coating materials and location information from each of the loaded mobile retail units to the network center;
  within each mobile retail unit, operating a power system that includes one or more electrical sources and a power management tool;
  within each mobile retail unit, maintaining an environmental window with a climate-control system of the mobile retail unit to preserve the retained coating materials from temperature extremes during storage and transportation in the mobile retail unit;
  receiving a purchase request and a location address for the purchase request at the network center;
  relaying the purchase request and the location address to a particular mobile retail unit of the loaded mobile retail units based on the received inventory information and location information;
  driving the particular mobile retail unit to the location address in the purchase request;
  customizing a tint of the coating materials with one or more customized-tint stations retained in the particular mobile retail unit;
  balancing distribution of electrical power from the one or more electrical sources between the one or more customized-tint stations, the climate-control system, and optionally one or more additional devices of the particular mobile retail unit with the use of the power management tool to limit a total electrical power consumption such that the climate-control system maintains an interior of the mobile retail unit within the environmental window at least while the mobile retail unit retains the coating materials; and
  providing the coating materials with the customized tint to a customer.

15. The method of claim 14, wherein, for each mobile retail unit, the one or more electrical sources comprise an auxiliary generator, and wherein balancing the distribution of electrical power from the one or more electrical sources comprises balancing the distribution of electrical power from the auxiliary generator.

16. The method of claim 14, wherein at least a portion of the mobile retail units have different sizes, and wherein relaying the purchase request and location address to the particular mobile retail unit is also based on the size of the particular mobile retail unit.

17. The method of claim 14, and further comprising updating inventory information of the coating materials in the particular mobile retail unit, and relaying the updated inventory information to the network center.

18. The method of claim 14, and further comprising simulating one or more lighting conditions within an interior of the particular mobile retail unit.

19. The method of claim 14, and further comprising storing a colorant prescription for customizing the tint of the coating materials to a computer-based system retained by the particular mobile retail unit.

20. The method of claim 19, and further comprising relaying the colorant prescription from the computer-based system of the particular mobile retail unit to the network center.

* * * * *